US007991828B2

(12) United States Patent
Shinomiya

(10) Patent No.: US 7,991,828 B2
(45) Date of Patent: Aug. 2, 2011

(54) NETWORK COMMUNICATION APPARATUS GENERATING XML RESPONSES BASED ON HTTP REQUESTS

(75) Inventor: Kiyohiko Shinomiya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1218 days.

(21) Appl. No.: 11/188,051

(22) Filed: Jul. 25, 2005

(65) Prior Publication Data

US 2006/0028691 A1 Feb. 9, 2006

(30) Foreign Application Priority Data

| Aug. 6, 2004 | (JP) | ................................ 2004-230272 |
| Nov. 18, 2004 | (JP) | ................................ 2004-334020 |
| Mar. 18, 2005 | (JP) | ................................ 2005-079832 |

(51) Int. Cl.
*G06F 15/16* (2006.01)
(52) U.S. Cl. ........ 709/203; 709/202; 709/217; 709/246; 358/402; 358/403
(58) Field of Classification Search .......... 709/202–203, 709/217–219, 245–246; 358/400–407
See application file for complete search history.

(56) References Cited

U.S. PATENT DOCUMENTS

| 6,230,189 | B1 * | 5/2001 | Sato et al. ...................... 709/217 |
| 6,396,848 | B1 * | 5/2002 | Ohta ............................. 370/490 |
| 6,404,762 | B1 |  6/2002 | Luzeski et al. |
| 6,498,837 | B1 * | 12/2002 | Baba ........................ 379/100.08 |
| 6,901,431 | B1 * |  5/2005 | Dodrill et al. ................. 709/207 |
| 7,007,229 | B2 * |  2/2006 | DelGobbo et al. ............ 715/212 |
| 7,042,593 | B2 * |  5/2006 | Matsushima .................. 709/217 |
| 7,069,302 | B2 * |  6/2006 | Saito et al. ..................... 709/217 |
| 7,409,362 | B2 * |  8/2008 | Calabria .......................... 705/26 |
| 7,483,162 | B2 |  1/2009 | Matsushima |
| 7,644,414 | B2 * |  1/2010 | Smith et al. ................... 719/328 |
| 7,647,370 | B1 * |  1/2010 | Liu et al. ....................... 709/203 |

(Continued)

FOREIGN PATENT DOCUMENTS

CN        1427614 A        7/2003

(Continued)

OTHER PUBLICATIONS

Joseph Smarr, "Technical and Privacy Challenges for Integrating FOAF into Existing Applications", 1st Workshop on Friend of a Friend, Social Networking and Semantic Web, IL, World Wide Web Consortium, URL, w3.org/2001/sw/Europe/events/foaf-galway/papers/fp/technical_and_privacy_challenges/, Sep. 1, 2004, pp. 1-5.

(Continued)

*Primary Examiner* — Bharat N Barot
(74) *Attorney, Agent, or Firm* — Oblon, Spivak, McClelland, Maier & Neustadt, L.L.P.

(57) ABSTRACT

A hyper-text-transfer-protocol communication unit sends and receives data based on a hyper text transfer protocol via a network. A facsimile communication unit sends and receives facsimile data based on a facsimile transmission procedure via a public line. A history storing unit stores communication history data. A history sending unit sends, when a request for acquiring the communication history data is received from a terminal based on the hyper text transfer protocol via the network, the communication history data to the terminal via the network as a semantic extensible-markup-language document, based on the request received.

27 Claims, 39 Drawing Sheets

U.S. PATENT DOCUMENTS

| | | | |
|---|---|---|---|
| 2003/0028577 A1* | 2/2003 | Dorland et al. | 709/200 |
| 2005/0027846 A1* | 2/2005 | Wolfe et al. | 709/203 |
| 2006/0136424 A1* | 6/2006 | Nuggehalli et al. | 707/10 |

FOREIGN PATENT DOCUMENTS

| | | |
|---|---|---|
| JP | 2000-4252 | 1/2000 |
| JP | 2000-59417 | 2/2000 |
| JP | 2000-92262 | 3/2000 |
| JP | 2001-318869 | 11/2001 |
| JP | 2002-7095 | 1/2002 |
| JP | 2002-204332 | 7/2002 |
| JP | 2003-11445 | 1/2003 |
| JP | 2003-178285 | 6/2003 |
| JP | 2004-178061 | 6/2004 |

OTHER PUBLICATIONS

Libby Miller, et al., "Swad-Europe Deliverable 3.16: Final Workshop Report", IL, World Wide Web Consortium, URL, w3. org/2001/sw/Europe/reports/final_workshop_report/, Sep. 29, 2004, pp. 1-6.

Hisanobu Matsuoka, et al., "Weblog Analysis for Egocentric Communication Support" The Institute of Electronics, Information and Communication Engineers, vol. 104, No. 725, pp. 7-12, Mar. 8, 2005.

* cited by examiner

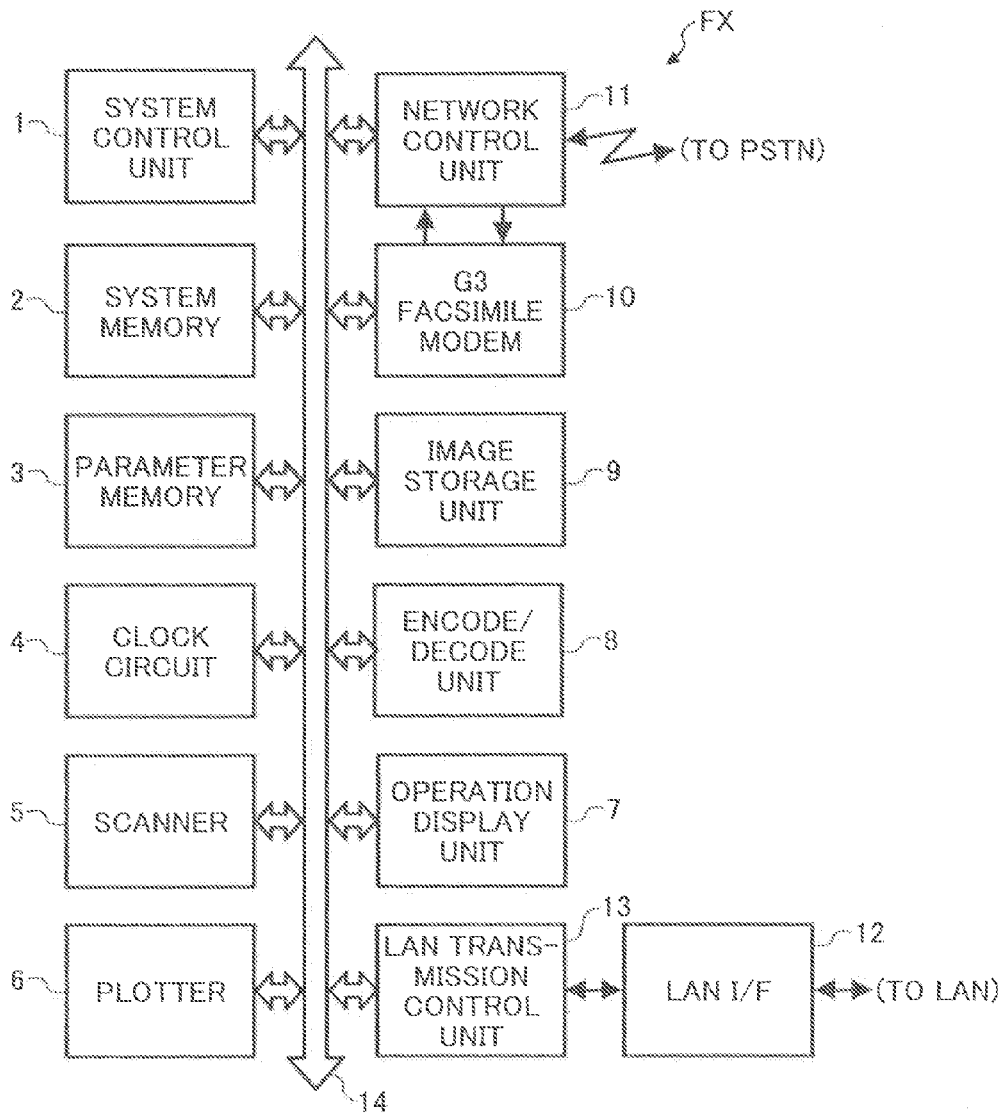
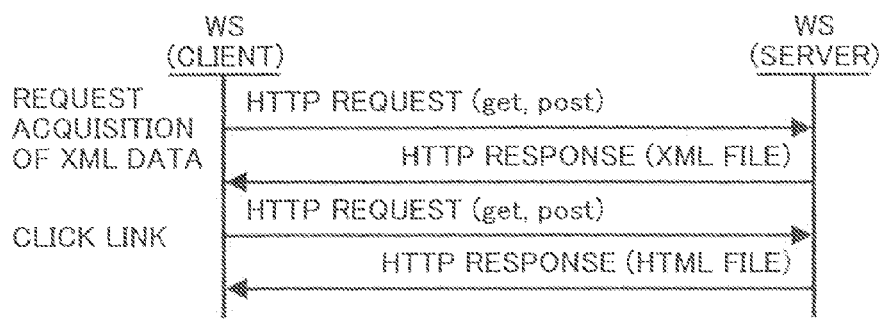

FIG. 4
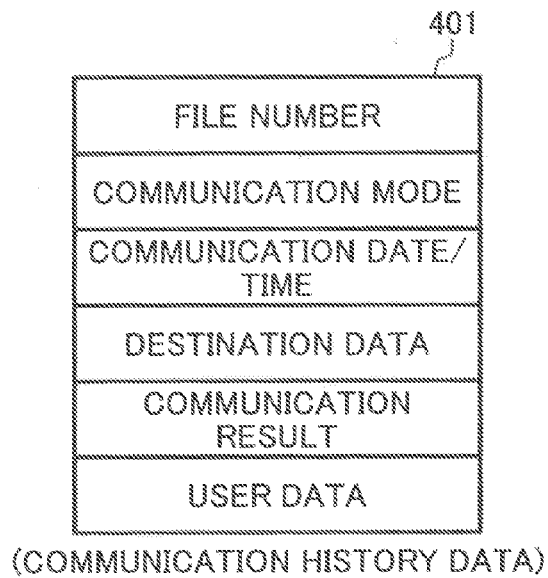
(COMMUNICATION HISTORY DATA)
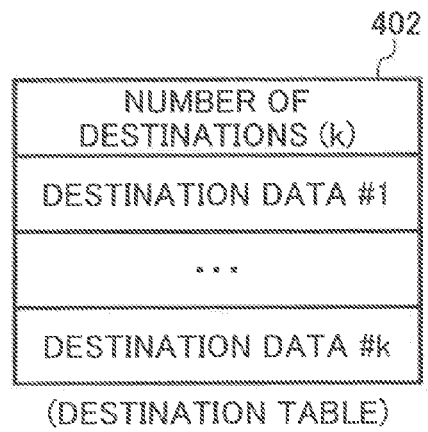
(DESTINATION TABLE)
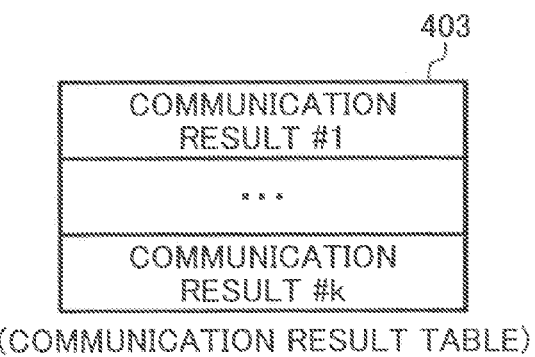
(COMMUNICATION RESULT TABLE)

```
<?xml version="1.0" encoding="UTF-8" ?>
<rdf:RDF xmlns:rdf="http://www.w3.org/1999/02/22-rdf-syntax-ns#"
  xmlns:dc="http://purl.org/dc/elements/1.1/">
  <channel rdf:about="http://fax001.abc.co.jp/ (URL OF NETWORK FACSIMILE)">
    <title>COMMUNICATION HISTORY OF FAX001 [TRANSMISSION]</title>
    <link>http://fax001.abc.co.jp/history/transmission/ichiran.html (URL OF
    TRANSMISSION HISTORY DATA LIST PAGE)</link>
    <description> WILL DISPLAY FAX COMMUNICATION HISTORY [TRANSMISSION].
    </description>
    <image rdf:resource=" http://fax001.abc.co.jp/images/icons/icon01.gif (URL OF
    ICON DATA)"/>
    <dc:language>ja</dc:language>        NAME OF MACHINE
    <dc:creator>FAX001(            )</dc:creator>
    <dc:date>2004-02-24T14:34:21+09:00</dc:date>
      <items>
      <rdf:Seq>
      <rdf:li rdf:resource="http://trc/1-1 /(ID DATA OF ITEM ELEMENT)"/>
      <rdf:li rdf:resource="http://trc/1-2 /(ID DATA OF ITEM ELEMENT)"/>
      <rdf:li rdf:resource="http://trc/2 /(ID DATA OF ITEM ELEMENT)"/>
      </rdf:Seq>
      </items>                              URL OF TRANSMISSION
  </channel>                                HISTORY DATA PAGE
    <item rdf:about=" http://tcr/1-1/">
      <title> COMMUNICATION HISTORY: TRANSMISSION[001-1]</title>
      <link>http://fax001.abc.co.jp/history/transmission/001.html (        )/
         TRANSMISSION DATE/TIME  DESTINATION  DESTINATION NUMBER
</link>
      <description>  [2004-02-21T15:07:00]  [0123456789(   )] LINE [F_G3]
                                               NUMBER OF PAGES
[1] TRANSMISSION RESULT[OK]   [User01]  FILE NUMBER [001]  </description>
    TRANSMISSION USER NAME
      <dc:subject> TRANSMISSION RESULT OF FILE NUMBER 001-1</dc:subject>
      <dc:publisher>FAX_Maker (MANUFACTURER NAME)</dc:publisher>
      <dc:creator>User01 (TRANSMISSION   </dc:creator>  TRANSMISSION
                  USER NAME)                            DATE/TIME
      <dc:date>2004-02-21T15:07:00+09:00(                )</dc:date>
      <image rdf:about="http://fax001.abc.co.jp/images/files/001.jpg(   )">
      <link>http://fax001.abc.co.jp/images/files/001.tif(   )</link>   URL OF
      </image>                           URL OF IMAGE DATA FILE    THUMBNAIL
    </item>
    <item rdf:about="http://tcr/1-2/">
      <title> COMMUNICATION HISTORY:TRANSMISSION[001-2]</title>
      <link>http://fax001.abc.co.jp/history/trasmission/001.html (  )/
         TRANSMISSION DATE/TIME   DESTINATION   URL OF TRANSMISSION
</link>                                          HISTORY DATA PAGE
      <description>  [2004-02-21T15:07:00]  [0123459876 ( )]LINE[F_G3]
                                              DESTINATION   NUMBER
                                              NUMBER        OF PAGES
```

FIG. 6B

```
[1] TRANSMISSION RESULT[OK]      [User01]   FILE NUMBER [001]   </description>
    TRANSMISSION USER NAME
       <dc:subject> TRANSMISSION RESULT OF FILE NUMBER 001-2</dc:subject>
       <dc:publisher>FAX_Maker (MANUFACTURER NAME)</dc:publisher>
                      (TRANSMISSION                  TRANSMISSION
       <dc:creator>User01  USER NAME)   <dc:creator>  DATE/TIME
       <dc:date>2004-02-21T15:07:05+09:00(              )</dc:date>
       <image rdf:about="http://fax001.abc.co.jp/images/files/001.jpg(    )">
       <link>http://fax001.abc.co.jp/images/files/001.tif(    )</link>   URL OF
       </image>                          URL OF IMAGE DATA FILE         THUMBNAIL
       </item>
       <item rdf:about="http://tcr/2/">
         <title> COMMUNICATION HISTORY:TRANSMISSION[002]</title>
         <link>http://fax001.abc.co.jp/history/trasmission/002.html(    )/
         TRANSMISSION DATE/TIME             URL OF TRANSMISSION
</link>                      DESTINATION    HISTORY DATA PAGE
       <description>   [2004-02-24T10:57:24]   [0987543210 (    )] LINE[F_G3]
                                              DESTINATION NUMBER
                                                                  NUMBER OF PAGES
[1] TRANSMISSION RESULT[OK]      [User02]   FILE NUMBER [002]   </description>
    TRANSMISSION USER NAME
       <title> COMMUNICATION HISTORY:TRANSMISSION[002]</title>
       <dc:subject> TRANSMISSION RESULT OF FILE NUMBER 002</dc:subject>
       <dc:publisher>FAX_Maker (MANUFACTURER NAME)</dc:publisher>
                      (TRANSMISSION                  TRANSMISSION
       <dc:creator>User02  USER NAME)   </dc:creator>  DATE/TIME
       <dc:date>2004-02-24T10:57:24+09:00(              )</dc:date>
       <image rdf:about="http://fax001.abc.co.jp/images/files/002.jpg(    )">
       <link>http://fax001.abc.co.jp/images/files/002.tif(    )</link>   URL OF
       </image>                          URL OF IMAGE DATA FILE         THUMBNAIL
       </item>
</rdf:RDF>
```

```
<?xml version="1.0" encoding="UTF-8" ?>
<feed version="0.3" xmlns="http://purl.org/atom/ns#" xmlns:dc="http://purl.org/dc/
elements/1.1/" xml:lang="ja">   ┌─ FAX COMMUNICATION HISTORY [TRANSMISSION]
<title>                         </title>
<link rel="alternate" type="text/html" href="http://fax001.abc.co.jp/ (URL OF
NETWORK FACSIMILE)"/>
<modified>2004-02-25T11:42:45Z</modified>
<tagline> WILL DISPLAY FAX COMMUNICATION HISTORY [TRANSMISSION].
</tagline>                      URL OF MANUFACTURE'S HOMEPAGE
<id>tag:fax001.abc.co.jp/</id>
<generator url="http://www.maker.co.jp/(        )" version="1.0">FAX_Maker
(MANUFACTURER NAME)</generator>
<copyright>Copyright (c) 2004, ricoh</copyright>
<entry>
  <title>COMMUNICATION HISTORY:TRANSMISSION[001-1]</title>
  <link rel="alternate" type="text/html" href="http://fax001.abc.co.jp/history/
  transmission/001.html (URL OF TRANSMISSION HISTORY DATA PAGE)"/>
  <modified>2004-02-25T11:42:45Z</modified>
  <issued>2004-02-25T20:42:45+09:00</issued>
  <id>tag:fax001.abc.co.jp//1</id>
                                                          DESTINATION
  <created>2004-02-25T11:42:45Z</created>       DESTINATION  NUMBER
                        TRANSMISSION DATE/TIME <summary type="text/plain">   [2004-02-21T15:07:00]   [0123456789 (   )] LINE
[F_G3] NUMBER OF PAGES[1]        TRANSMISSION   [User01] FILE NUMBER
       TRANSMISSION RESULT[OK]   USER NAME
[001] </summary>
</author>
  <name>FAX001 (NAME OF MACHINE)</name>
</author>
<dc:subject> TRANSMISSION RESULT OF FILE NUMBER 001</dc:subject>
<content type="text/html" mode="escaped" xml:lang="jp" xml:base="http://fax001.
abc.co.jp/">
```

FIG. 7B

```
<![CDATA[
  <p>
   <table>
    <tr>         TRANSMISSION DATE/TIME
     <td>   </td>
     <td>[2004-02-21T15:07:00]</td>
    </tr>
    <tr>     DESTINATION
     <td>   </td>      DESTINATION NUMBER
     <td>[0123456789 (   )]</td>
    </tr>
    <tr>
     <td>LINE</td>
     <td>[F_G3]</td>
    </tr>
    <tr>     NUMBER OF PAGES
     <td>   </td>
     <td>[1]</td>
    </tr>
    <tr>     TRANSMISSION RESULT
     <td>   </td>
     <td>[OK]</td>
    </tr>
    <tr>     TRANSMISSION USER NAME
     <td>   </td>
     <td>[User01]</td>
    </tr>
    <tr>     FILE NUMBER
     <td>   </td>
     <td>[001]</td>
    </tr>
   </table><br />
  </p>
]]>
</content>
</entry>
```

(DATA OF Atom FROMAT;1/3)

FIG. 8

```
<entry>           COMMUNICATION HISTORY [TRANSMISSION]
  <title>         [001-2]</title>
  <link rel="alternate" type="text/html" href="http://fax001.abc.co.jp/history/
  transmission/001.html (URL OF TRANSMISSION HISTORY DATA PAGE)"/>
  <modified>2004-02-25T11:42:45Z</modified>        DESTINATION
  <issued>2004-02-25T20:42:45+09:00</issued>                    DESTINATION
  <id>tag:fax001.abc.co.jp//2</id>          TRANSMISSION       NUMBER
  <created>2004-02-25T11:42:45Z</created>   DATE/TIME
  <summary type="text/plain">               [2004-02-21T15:07:00]  [0123459876 (
  )] LINE
[F_G3] NUMBER OF PAGES [1]        TRANSMISSION    [User01] FILE NUMBER[001]
       TRANSMISSION RESULT [OK]   USER NAME
</summary>
<author>
  <name>FAX001 (NAME OF MACHINE)</name>
</author>
<dc:subject> TRANSMISSION RESULT OF FILE NUMBER 001-2</dc:subject>
<content type="text/html" mode="escaped" xml:lang="jp" xml:base="http://fax001.
abc.co.jp/">
<![CDATA [
  <p>
  <table>
  <tr>        TRANSMISSION DATE/TIME
  <td>        </td>
  <td>[2004-02-21T15:07:00]</td>
  </tr>
  <tr>        DESTINATION
  <td>        </td>        DESTINATION NUMBER
  <td>[0123459876 (      )]</td>
  </tr>
  <tr>
  <td>LINE</td>
  <td>[F_G3]</td>
  </tr>
  <tr>        NUMBER OF PAGES
  <td>        </td>
  <td>[1]</td>
  </tr>
  <tr>        TRANSMISSION RESULT
  <td>        </td>
  <td>[OK]</td>
  </tr>
  <tr>        TRANSMISSION USER NAME
  <td>        </td>
  <td>[User01]</td>
  </tr>
  <tr>        FILE NUMBER
  <td>        </td>
  <td>[001]</td>
  </tr>
  </table><br />
  </p>
]]>
</content>
</entry>
```

(DATA OF Atom FORMAT ; 2/3)

FIG. 9

```
<entry>
  <title> COMMUNICATION HISTORY [TRANSMISSION][002]</title>
  <link rel="alternate" type="text/html" href="http://fax001.abc.co.jp/history/
  transmission/002.html (URL OF TRANSMISSION HISTORY DATA PAGE)"/>
  <modified>2004-02-25T11:42:45Z</modified>              DESTINATION
  <issued>2004-02-25T20:42:45+09:00</issued>                     DESTINATION
  <id>tag:fax001.abc.co.jp//3</id>           TRANSMISSION        NUMBER
  <created>2004-02-25T11:42:45Z</created>    DATE/TIME
  <summary type="text/plain">                [2004-02-24T10:57:24]   [0987654321 (
  )] LINE
[F_G3] NUMBER OF PAGES [1]       TRANSMISSION    [User02] FILE NUMBER[002]
       TRANSMISSION RESULT [OK]  USER NAME
</summary>
  <author>
    <name>FAX001 (NAME OF MACHINE)</name>
  </author>
  <dc:subject> TRANSMISSION RESULT OF FILE NUMBER 002 </dc:subject>
  <content type="text/html" mode="escaped" xml:lang="jp" xml:base="http://fax001.
abc.co.jp/">
<![CDATA [
  <p>
  <table>
  <tr>        TRANSMISSION DATE/TIME
  <td>   </td>
  <td>[2004-02-21T15:07:00]</td>
  </tr>
  <tr>        DESTINATION
  <td>   </td>         DESTINATION NUMBER
  <td>[0123459876 (   )]</td>
  </tr>
  <tr>
  <td>LINE</td>
  <td>[F_G3]</td>
  </tr>
  <tr>        NUMBER OF PAGES
  <td>   </td>
  <td>[1]</td>
  </tr>
  <tr>        TRANSMISSION RESULT
  <td>   </td>
  <td>[OK]</td>
  </tr>
  <tr>        TRANSMISSION USER NAME
  <td>   </td>
  <td>[User01]</td>
  </tr>
  <tr>        FILE NUMBER
  <td>   </td>
  <td>[001]</td>
  </tr>
  </table><br />
  </p>
]]>
  </content>
</entry>
</feed>
```

(DATA OF Atom FORMAT ; 3/3)

| DATE | TITLE | |
|---|---|---|
| 02/21 15:07:00 | [001-1] | ◄-- (SELECTED) |
| 02/21 15:07:05 | [001-2] | ◄-- (NOT SELECTED) |
| 02/24 10:57:24 | [002] | ◄-- (NOT SELECTED) |

COMMUNICATION HISTORY : TRANSMISSION

Feed : COMMUNICATION HISTORY OF FAX001 [TRANSMISSION]
Title : COMMUNICATION HISTORY : TRANSMISSION [001-1]

TRANSMISSION DATE / TIME [2004-02-21T15:07:00]
DESTINATION [0123456789] LINE [F_G3]
NUMBER OF PAGES [1] TRANSMISSION RESULT [OK]
TRANSMISSION USER NAME [User01]
FILE NUMBER [001]

PA1 — COMMUNICATION HISTORY OF FAX
- COMMUNICATION HISTORY OF FAX001 [TRANSMISSION]
- COMMUNICATION HISTORY OF FAX001 [RECEPTION]
- COMMUNICATION HISTORY OF FAX002 [TRANSMISSION]
- COMMUNICATION HISTORY OF FAX002 [RECEPTION]

PA3, IC, PA2

---

1002

| DATE | TITLE | |
|---|---|---|
| 02/21 15:07:00 | [001-1] | ◄-- (SELECTED) |
| 02/21 15:07:05 | [001-2] | ◄-- (NOT SELECTED) |
| 02/24 10:57:24 | [002] | ◄-- (NOT SELECTED) |

COMMUNICATION HISTORY : TRANSMISSION

Feed : COMMUNICATION HISTORY OF FAX001 [TRANSMISSION]
Title : COMMUNICATION HISTORY : TRANSMISSION [001-1]

| | |
|---|---|
| TRANSMISSION DATE / TIME | : 2004/02/21 15:07 |
| DESTINATION | : 0123456789 |
| LINE | : G3 |
| LINEAR DENSITY | : FINE |
| NUMBER OF PAGES | : 1 |
| TRANSMISSION RESULT | : OK |
| TRANSMISSION USER NAME | : User01 |
| DOCUMENT NUMBER | : 001 |

PA1 — COMMUNICATION HISTORY OF FAX
- COMMUNICATION HISTORY OF FAX001 [TRANSMISSION]
- COMMUNICATION HISTORY OF FAX001 [RECEPTION]
- COMMUNICATION HISTORY OF FAX002 [TRANSMISSION]
- COMMUNICATION HISTORY OF FAX002 [RECEPTION]

```
(ROW NUMBER)
 1  <rdf:RDF
 2      xmlns:rdf="http://www.w3.org/1999/02/22-rdf-syntax-ns#"
 3      xmlns:rdfs="http://www.w3.org/2000/01/rdf-schema#"
 4      xmlns:foaf="http://xmlns.com/foaf/0.1/"/>
 5  <foaf:Person>
 6      <foaf:name>133.xxx.61.102</foaf:name>
 7      <foaf:nick>gw_target12</foaf:nick>
 8      <foaf:mbox rdf:resource="mailto:gw_target12@dmn01.userworkplace.co.jp"/>
 9      <foaf:homepage rdf:resource="http://133.xxx.61.102/web/guest/ja/websys/webArch/mainFrame.cgi"/>
10      <foaf:depiction rdf:resource=" "/>
11      <foaf:phone rdf:resource="tel:0123-456-7890"/>
12      <foaf:workplaceHomepage rdf:resource="http://www.userworkplace.co.jp/"/>
13      <foaf:Organization>
14          <foaf:name>User WorkplaceName</foaf:name>
15          <foaf:homepage rdf:resource="http://www.userworkplace.co.jp/project/"/>
16      </foaf:Organization>
17      <foaf:maker>
18          <foaf:Person>
19              <foaf:name>MAKER</foaf:name>
20              <foaf:nick>MODEL Neo271</foaf:nick>
21              <foaf:depiction rdf:resource="http://www.MAKER.co.jp/MODEL/neo/271/img/index_5.jpg"/>
22              <foaf:homepage rdf:resource="http://www.MAKER.co.jp/MODEL/neo/271/"/>
23              <foaf:mbox rdf:resource="mailto:support@MAKER.co.jp"/>
24          </foaf:Person>
25      </foaf:maker>
26      <foaf:knows>
27          <foaf:Person>
28              <foaf:name>133.xxx.61.38</foaf:name>
29              <foaf:nick>gw_mfp01</foaf:nick>
30              <foaf:mbox rdf:resource="mailto:gw_mfp01@dmn01.userworkplace.co.jp"/>
31              <rdfs:seeAlso rdf:resource="http://133.xxx.61.38/web/guest/ja/websys/webArch/foaf.xml"/>
32          </foaf:Person>
33      </foaf:knows>
```

DATA OF LOCAL TERMINAL: rows 6–26

DATA OF RELATED DEVICE #1: rows 27–32

FIG. 19B

```
33    </foaf:knows>
34    <foaf:Person>
35    <foaf:name>133.xxx.61.111</foaf:name>
36    <foaf:nick>gw_mfp111</foaf:nick>
37    <foaf:mbox rdf:resource="mailto:gw_mfp111@dmn01.userworkplace.co.jp" />
38    <rdfs:seeAlso rdf:resource="http://133.xxx.61.111/web/guest/ja/websys/webArch/foaf.xml" />
39    </foaf:Person>
40    </foaf:knows>
41    </foaf:Person>
42    </rdf:RDF>
```

DATA OF RELATED DEVICE #2: lines 33–40

(FOAF DATA)

(EXAMPLE OF FOAF CLIENT SCREEN)

```
<rdf:RDF
    xmlns:rdf="http://www.w3.org/1999/02/22-rdf-syntax-ns#"
    xmlns:rdfs="http://www.w3.org/2000/01/rdf-schema#"
    xmlns:foaf="http://xmlns.com/foaf/0.1/"/>
<foaf:Person>
    <foaf:name>133.139.61.102</foaf:name>
    <foaf:nick>gw_target12</foaf:nick>
    <foaf:mbox rdf:resource="mailto:gw_target12@toda.ricoh.co.jp"/>
    <foaf:homepage rdf:resource="http://133.139.61.102/web/guest/ja/websys/
webArch/mainFrame.cgi"/>
    <foaf:phone rdf:resource="tel:046-228-8539"/>
    <foaf:workplaceHomepage rdf:resource="http://www.ricoh.co.jp/"/>
    <foaf:Organization>
        <foaf:name>RICOH FAX project</foaf:name>
        <foaf:homepage rdf:resource="http://www.ricoh.co.jp/fax/"/>
    </foaf:Organization>
    <foaf:maker>
        <foaf:Person>
            <foaf:name>RICOH</foaf:name>
            <foaf:nick>imagio Neo271</foaf:nick>
            <foaf:depiction rdf:resource="http://www.ricoh.co.jp/imagio/neo/271/img/index.
5.jpg"/>
            <foaf:homepage rdf:resource="http://www.ricoh.co.jp/imagio/neo/271/"/>
            <foaf:mbox rdf:resource="mailto:support@ricoh.co.jp"/>
        </foaf:Person>
    </foaf:maker>
    <foaf:knows>
        <foaf:Person>
```

- LOCAL IP ADDRESS
- LOCAL HOST NAME
- LOCAL E-MAIL ADDRESS
- LOCAL WEB FUNCTION HOMEPAGE
- LOCAL TELEPHONE NUMBER (CSI)
- COMPANY HOMEPAGE OF DEVICE OWNER
- COMPANY DATA OF DEVICE OWNER
- COMPANY ORGANIZATION NAME OF DEVICE OWNER
- COMPANY ORGANIZATION HOMEPAGE OF DEVICE OWNER

- MANUFACTURER DATA OF DEVICE

- MANUFACTURER NAME OF DEVICE
- MODEL NAME OF DEVICE
- PHOTOGRAPH OF DEVICE

- CATALOG OF DEVICE
- MANUFACTURER E-MAIL ADDRESS OF DEVICE

- DATA OF RELATED DEVICE

FIG. 25B

```
<foaf:name>133.139.61.38</foaf:name>
<foaf:nick>gw_mfp01</foaf:nick>
<foaf:mbox rdf:resource="mailto:gw_mfp01@nts.ricoh.co.jp"/>
<rdfs:seeAlso rdf:resource="http://133.139.61.38/web/guest/ja/websys/webArch/foaf.xml"/>
</foaf:Person>
<foaf:knows>
<foaf:Person>
<foaf:name>133.139.61.111</foaf:name>
<foaf:nick>gw_mfp111</foaf:nick>
<foaf:mbox rdf:resource="mailto:gw_mfp111@nts.ricoh.co.jp"/>
<rdfs:seeAlso rdf:resource="http://133.139.61.111/web/guest/ja/websys/webArch/foaf.xml"/>
</foaf:Person>
</foaf:knows>
</foaf:Person>
</rdf:RDF>
```

← IP ADDRESS OF RELATED DEVICE
← HOST NAME OF RELATED DEVICE
← E-MAIL ADDRESS OF RELATED DEVICE
← FOAF URL OF RELATED DEVICE

← DATA OF RELATED DEVICE

← IP ADDRESS OF RELATED DEVICE
← HOST NAME OF RELATED DEVICE
← E-MAIL ADDRESS OF RELATED DEVICE
← FOAF URL OF RELATED DEVICE

SCREEN DISPLAYING FOAF (BEFORE MERGING)

SCREEN DISPLAYING FOAF (AFTER MERGING)

FIG. 31

| FIG. 31A |
|---|
| FIG. 31B |
| FIG. 31C |

FIG. 31A

DEVICE A (133.139.61.102) FOAF
```
<rdf:RDF
  xmlns:rdf="http://www.w3.org/1999/02/22-rdf-syntax-ns#"
  xmlns:rdfs="http://www.w3.org/2000/01/rdf-schema#"
  xmlns:foaf="http://xmlns.com/foaf/0.1/">
<foaf:Person>
```
[MAGENTA]
```
  <foaf:name>133.139.61.102</foaf:name>
  <foaf:nick>gw_target12</foaf:nick>
  <foaf:mbox rdf:resource="mailto:gw_target12@toda.ricoh.co.jp"/>
  <foaf:homepage rdf:resource="http://133.139.61.102/web/guest/ja/websys/webArch/mainFrame.cgi"/>
  <foaf:phone rdf:resource="tel:046-228-8539"/>
  <foaf:workplaceHomepage rdf:resource="http://www.ricoh.co.jp/"/>
  <foaf:Organization>
    <foaf:name>RICOH FAX project</foaf:name>
    <foaf:homepage rdf:resource="http://www.ricoh.co.jp/fax/"/>
  </foaf:Organization>
  <foaf:maker>
  <foaf:Person>
    <foaf:name>RICOH</foaf:name>
    <foaf:nick>Imagio Neo271</foaf:nick>
    <foaf:depiction rdf:resource="http://www.ricoh.co.jp/imagio/neo271/img/index_5.jpg"/>
    <foaf:homepage rdf:resource="http://www.ricoh.co.jp/imagio/neo271/"/>
    <foaf:mbox rdf:resource="mailto:support@ricoh.co.jp"/>
  </foaf:Person>
  </foaf:maker>
</foaf:Person>
</rdf:RDF>
```

DEVICE B (133.139.61.111) FOAF
```
<rdf:RDF
  xmlns:rdf="http://www.w3.org/1999/02/22-rdf-syntax-ns#"
  xmlns:rdfs="http://www.w3.org/2000/01/rdf-schema#"
  xmlns:foaf="http://xmlns.com/foaf/0.1/">
<foaf:Person>
```
[BLUE]
```
  <foaf:name>133.139.61.111</foaf:name>
  <foaf:nick>gw_target11</foaf:nick>
  <foaf:mbox rdf:resource="mailto:gw_target111@toda.ricoh.co.jp"/>
  <foaf:homepage rdf:resource="http://133.139.61.111/web/guest/ja/websys/webArch/mainFrame.cgi"/>
  <foaf:phone rdf:resource="tel:046-228-1111"/>
  <foaf:workplaceHomepage rdf:resource="http://www.ricoh.co.jp/"/>
  <foaf:Organization>
    <foaf:name>RICOH FAX project</foaf:name>
    <foaf:homepage rdf:resource="http://www.ricoh.co.jp/fax/"/>
  </foaf:Organization>
  <foaf:maker>
  <foaf:Person>
    <foaf:name>RICOH</foaf:name>
    <foaf:nick>Imagio Neo271</foaf:nick>
    <foaf:depiction rdf:resource="http://www.ricoh.co.jp/imagio/neo271/img/index_5.jpg"/>
    <foaf:homepage rdf:resource="http://www.ricoh.co.jp/imagio/neo271/"/>
    <foaf:mbox rdf:resource="mailto:support@ricoh.co.jp"/>
  </foaf:Person>
  </foaf:maker>
</foaf:Person>
```
[RED]
```
<foaf:knows>
<foaf:Person>
```

FIG. 31C

```
<foaf:mbox rdf:resource="mailto:support@ricoh.co.jp"/>
</foaf:Person>
</foaf:maker>
                                                    RED
<foaf:knows>
<foaf:Person>
<foaf:name>133.139.61.38</foaf:name>
<foaf:nick>gw_mfp01</foaf:nick>
<foaf:mbox rdf:resource="mailto:gw_mfp01@nts.ricoh.co.jp"/>
<rdfs:seeAlso rdf:resource="http://133.139.61.38/web/guest/
ja/websys/webArch/foaf.xml"/>
</foaf:Person>
</foaf:knows>

<foaf:knows>
<foaf:Person>                                       BLUE
<foaf:name>133.139.61.111</foaf:name>
<foaf:nick>gw_mfp111</foaf:nick>
<foaf:mbox rdf:resource="mailto:gw_mfp111@nts.ricoh.co.jp"/>
<rdfs:seeAlso rdf:resource="http://133.139.61.111/web/guest/
ja/websys/webArch/foaf.xml"/>
</foaf:Person>
</foaf:knows>
</foaf:Person>
</rdf:RDF>
```

EXAMPLE OF FOAF MERGING

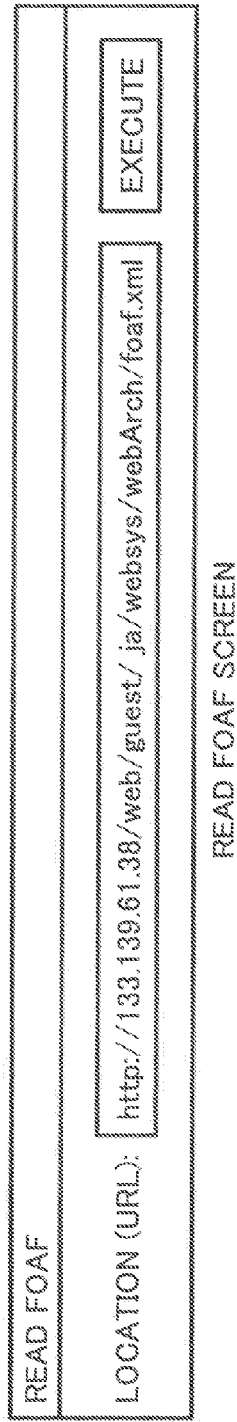

FIG. 34

READ FOAF

LOCATION (URL): http://133.139.61.38/web/guest/ja/websys/webArch/foaf.xml    EXECUTE

READ FOAF SCREEN

FIG. 35

```
<?xml version="1.0" encoding="utf-8" ?>
<opml version="1.1">
<head>
<title>imagio Neo 9998</title>
<ownername>RICOH 0001</ownername>
<owneremail>admin@ricoh.co.jp</owneremail>
</head>
<body>
<outline text="DEVICE A">
<outline text="gw_mfp01" xmlurl="http://133.139.61.38/web/guest/ja/websys/webArch/rss.xml" />    ← WHEN THERE IS URL OF XML ONLY
<outline text="gw_mfp111" xmlurl="http://133.139.61.111/web/guest/ja/websys/sebArch/rss.xml" />
</outline>
<outline text="DEVICE B">
<outline text="gw_mfp102" htmlurl="http://133.139.61.102/web/guest/ja/websys/webArch/index.html"
xmlurl="http://133.139.61.102/web/guest/ja/websys/webArch/rss.xml" />    ← WHEN THERE IS URL OF html AND XML
<outline text="gw_mfp102" htmlurl="http://133.139.61.102/web/guest/ja/websys/webArch/index.html" />    ← WHEN THERE IS URL OF html ONLY
</outline>
</body>
</opml>
```

EXAMPLE OF BINDING WITH OPML, RSS DATA ACQUIRED BY FOAF

FIG. 36

```
<?xml version="1.0" encoding="utf-8" ?>
<opml version="1.1">
<head>
<title>imagio Neo 9999</title>
<ownername>RICOH 0001</ownername>
<owneremail>admin@ricoh.co.jp</owneremail>
</head>
<body>
<outline text ="DEVICE A">
<outline text="gw_mfp01" xmlurl="http://133.139.61.38/web/guest/ja/websys/webArch/foaf.xml" />   ←── URL OF knows ELEMENT IN FOAF FILE OF DEVICE A
<outline text="gw_mfp111" xmlurl="http://133.139.61.111/web/guest/ja/websys/sebArch/foaf.xml" />
</outline>

<outline text ="DEVICE B">
<outline text="gw_mfp102" htmlurl="http://133.139.61.102/web/guest/ja/websys/webArch/index.html" xmlurl="http://133.139.61.102/web/guest/ja/websys/webArch/foaf.xml" />   ←── URL OF knows ELEMENT IN FOAF FILE OF DEVICE B
</outline>
</body>
</opml>
```

EXAMPLE OF BINDING WITH OPML, URL OF FOAF

MERGE CONDITION PROCESSING SEQUENCE

NETWORK COMMUNICATION APPARATUS GENERATING XML RESPONSES BASED ON HTTP REQUESTS

CROSS-REFERENCE TO RELATED APPLICATIONS

This application is based upon and claims the benefit of priority from Japanese Patent Application No. 2004-230272, filed Aug. 6, 2004; Japanese Patent Application No. 2004-334020, filed Nov. 18, 2004; and Japanese Patent Application No. 2005-079832, filed Mar. 18, 2005, the entire contents of which are incorporated herein by reference.

BACKGROUND OF THE INVENTION

1. Field of the Invention

The present invention relates to a network communication apparatus, and, more particularly, to a network communication apparatus having a hypertext transport protocol (HTTP) communication function and a facsimile communication function.

2. Description of the Related Art

Recently, an effort is focused on developing network communication apparatuses. Some of network communication apparatuses include an HTTP communication function for exchanging data through a network using HTTP, and a facsimile communication function for exchanging facsimile data by performing a facsimile transmission procedure. Japanese Patent Application Laid Open No. 2000-92262 discloses a technology for making device settings of the network communication apparatus through a network. Japanese Patent Application Laid Open No. 2002-7095 discloses the network communication apparatus that displays communication history data in a Web page.

In these examples, a user can make the settings from a remote location, instead of going to the location where the network communication apparatus is installed. Moreover, the user can use a personal computer that facilitates the operation of making the settings.

However, the conventional network communication apparatus can only display data as an HTML file in a Web browser. The HTML has limited capabilities; it is difficult to display the data, and the data cannot be used for secondary purposes.

There are needs for providing data of a terminal and relationships between terminals to a wide range of users through a network. Therefore, the data needs to be provided in a semantic extensible markup language (XML) format, such as a resource description framework (RDF) or a rich site summary (RSS) format.

SUMMARY OF THE INVENTION

It is an object of the present invention to at least solve the problems in the conventional technology.

A network communication apparatus according to one aspect of the present invention includes a hyper-text-transfer-protocol communication unit that sends and receives data based on a predetermined hyper text transfer protocol via a network; a facsimile communication unit that sends and receives facsimile data based on a predetermined facsimile transmission procedure via a public line; a history storing unit that stores communication history data; and a history sending unit that sends, when a request for acquiring the communication history data is received from a terminal based on the hyper text transfer protocol via the network, the communication history data stored in the history storing unit to the terminal via the network as a semantic extensible-markup-language document, based on the request received.

A network communication apparatus according to another aspect of the present invention includes a hyper-text-transfer-protocol communication unit that sends and receives data based on a predetermined hyper text transfer protocol via a network; a facsimile communication unit that sends and receives facsimile data based on a predetermined facsimile transmission procedure via a public line; a terminal-information storing unit that stores terminal information of a local terminal and a related terminal, as terminal-related information; and a terminal-information sending unit that sends, when a request for acquiring the terminal information is received from other terminal, the terminal-related information in a predetermined friend-of-a-friend format to the other terminal based on the hyper text transfer protocol to the terminal, as response information.

A network communication apparatus according to still another aspect of the present invention includes a communication unit that receives a request for acquiring data of a local terminal based on a hyper text transfer protocol from a client application operating in other terminal via a network; a data acquiring unit that acquires the data of the local terminal as a semantic extensible-markup-language document based on to the request; a sharing unit that outputs a rich site summary format, and causes the communication unit to send and receive the data of the local terminal and data of other terminal via the network, to disclose and share the data of the local terminal and the data of the other terminal in a friend-of-a-friend format; and a friend-of-a-friend acquiring unit that causes a friend-of-a-friend client connected to the local terminal to read and acquire friend-of-a-friend data of the other terminal via the network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram of a network facsimile apparatus FX shown in FIG. 1;

FIG. 3 is a time chart showing communication by HTTP;

FIG. 4 is a schematic of communication history data, a destination table, and a communication result table;

FIG. 6 is an example of transmission history data provided as an RSS feed;

FIGS. 7 to 9 are an example of transmission history data provided as an Atom feed;

FIG. 10 is an example of the RSS feed displayed by an RSS aggregator;

FIG. 19 is an example of FOAF data;

FIG. 25 is an example of FOAF data in XML;

FIG. 34 is a schematic of a screen for specifying a URL to read FOAF data of another device;

FIG. 35 is an example of an OPML file integrating RSS data;

FIG. 36 is an example of an OPML file integrating URLs of FOAF data; and

DETAILED DESCRIPTION OF THE PREFERRED EMBODIMENTS

Exemplary embodiments of a network communication apparatus according to the present invention will be explained in detail below with reference to the accompanying drawings.

Figure 1:
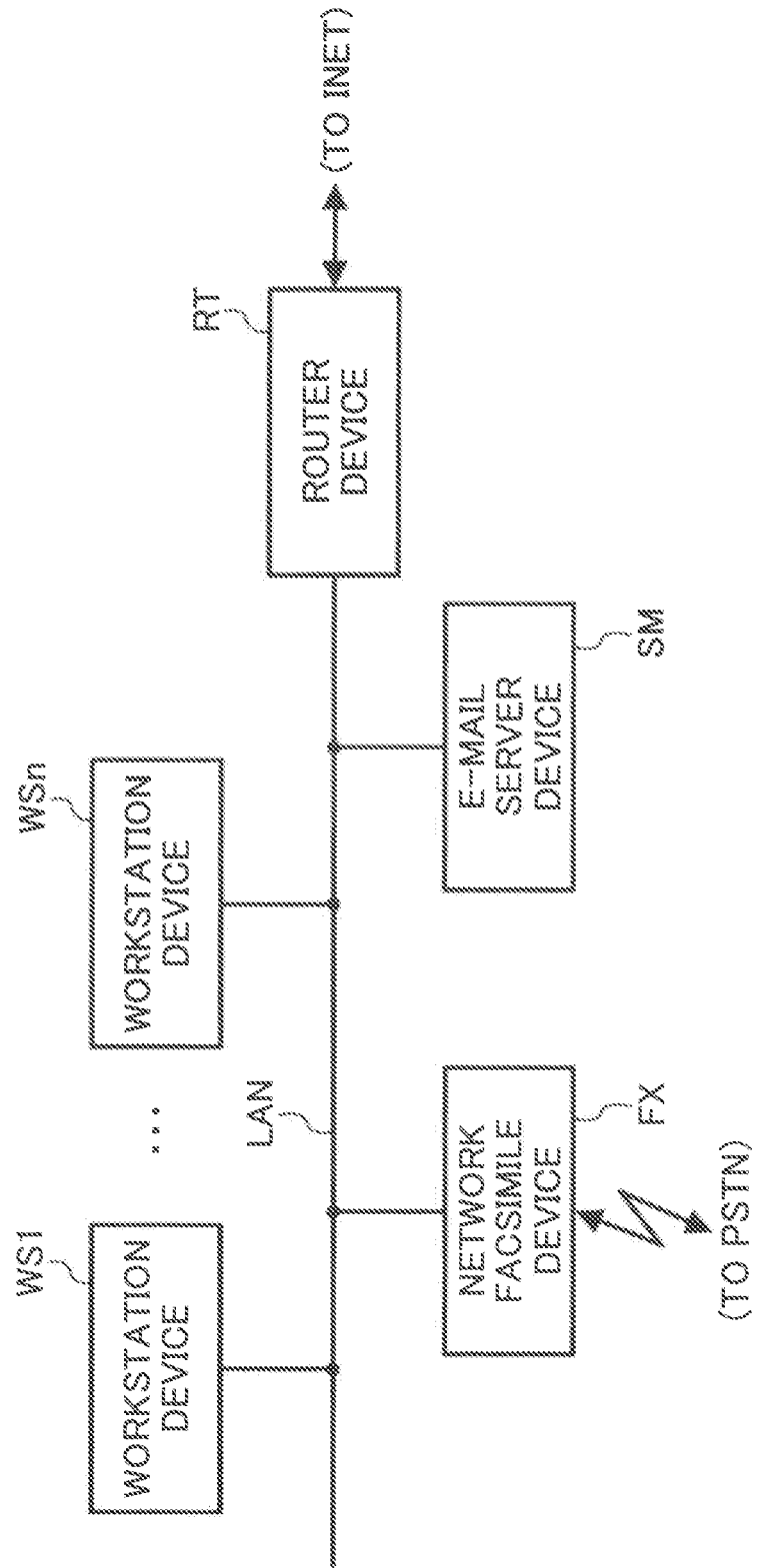
FIG. 1 is a block diagram of a network system according to a first embodiment of the present invention.

FIG. 1 is a block diagram of a network system according to a first embodiment of the present invention. A plurality of workstation devices WS1 to WSn, an e-mail server device SM, a network facsimile apparatus FX, and a router device RT are connected to each other through a local area network LAN. Moreover, these devices are connected to the Internet through the router device RT. Accordingly, the workstation devices WS1 to WSn, the e-mail server device SM, and the network facsimile apparatus FX can exchange data with other terminal devices through the Internet.

The e-mail server device SM distributes and collects e-mails to and from a user using the workstation devices WS1 to WSn and the network facsimile apparatus FX.

The workstation devices WS1 to WSn each include facsimile application software for creating, displaying, and outputting facsimile image data, and various programs such as software for exchanging data through the LAN. Each of the workstation devices WS1 to WSn is used by a specific user or users.

The network facsimile apparatus FX includes: an e-mail processing function for exchanging image data or a report by an e-mail; a facsimile communication function for connecting to an analog public switched telephone network (PSTN), and transmitting image data by using a group 3 (G3) facsimile transmission procedure; and a Web server function for sending data to other devices with the HTTP.

FIG. 2 is a block diagram of the network facsimile apparatus FX shown in FIG. 1. A system control unit 1 controls all units of the network facsimile apparatus FX, and performs various control processings such as a facsimile transmission control processing. A system memory 2 stores control processing programs performed by the system control unit 1, and various data required to perform the control processing programs. Moreover, the system memory 2 is used as a work area of the system control unit 1. A parameter memory 3 stores various data specific to the network facsimile apparatus FX. A clock circuit 4 outputs data of the present time.

A scanner 5 reads an image of an original at a predetermined resolution, and a plotter 6 records and outputs the image at a predetermined resolution. An operation display unit 7 includes various operation keys and display devices used for operating the network facsimile apparatus FX.

An encode/decode unit 8 encodes and compresses image signals into image data, and decodes the encoded and compressed image data back into the original image signals. An image storing unit 9 stores a large amount of encoded and compressed image data.

A G3 facsimile modem 10 realizes a modem function of a G3 facsimile, and includes a low-speed modem function (V.21) for exchanging transmission procedure signals, and high-speed modem functions (V.17, V.34, V.29, V27ter, etc.) mainly used for exchanging image data.

A network control unit 11 connects the network facsimile apparatus FX to the PSTN, and includes an automatic sending and receiving function.

A LAN interface circuit 12 connects the network facsimile FX to the LAN, and executes communication control processings for a specific protocol suite used for exchanging data with other terminal devices.

The system control unit 1, the system memory 2, the parameter memory 3, the clock circuit 4, the scanner 5, the plotter 6, the operation display unit 7, the encode/decode unit 8, the image storage unit 9, the G3 facsimile modem 10, the network control unit 11, and a LAN transmission control unit 13 are connected to an internal bus 14, and data is exchanged primarily through the internal bus 14.

The network control unit 11 directly exchanges data with the G3 facsimile modem 10.

According to the present embodiment, the terminals connected to the LAN exchange data with each other by a combination of protocols (so called protocol suite). The protocol suite combines the transmission control protocol/internet protocol (TCP/IP) of the transport layer and lower layers in the open systems interconnection (OSI) reference model, and a communication protocol of layers above the transport layer. For example, the simple mail transfer protocol (SMTP) of an upper layer is applied for exchanging e-mail data.

Moreover, the post office protocol (POP) can be applied when the terminals exchange data with the e-mail server SM to confirm receipt of an e-mail or to acquire an e-mail.

The communication protocols such as the TCP/IP, the SMTIP, and the POP, and data formats and data constructions of an e-mail are defined by the request for comment (RFC)

document issued by the Internet Engineering Task Force (IETF). For example, the TCP/IP is defined by the RFC 793, the SMTP by the RFC 821, the e-mail formats by the RFC 822, the RFC 1521, the RFC 1522 (multi-purpose mail extension (MIME) format), and so forth.

The HTTP is a protocol for realizing the world-wide web (WWW), and is typically exchanged on the TCP (port number: 80). The HTTP has many versions, and most browsers can only accommodate up to version 1.0 (RFC 1945). In 1.1 (RFC 2616), which is the newest version, many extensions are made in commands, responses, and formats. Terminals use an installed browser to view an HTML file in a server by exchanging commands and responses in HTTP.

FIG. 3 is a time chart showing communication by the HTTP. A browser used at the workstation device WS sends commands such as get or post to an HTTP server in the network facsimile apparatus FX to specify a processing. In response, the HTTP server sends an XML file, an HTML file, or an image file to the browser. According to the present embodiment, a client (workstation device) receives communication history data etc. as a semantic XML document.

XML data is metadata that is not read directly by a user, but is interpreted by a program to be applied in various forms. The XML is defined by a recommendation of the World Wide Web Consortium (W3C). The XML is a simplified and internet-compliant version of the standard generalized mark-up language (SGML) (International Organization for Standardization/International Electrotechnical Commission (ISO/IEC) 8879:1986). Unlike the HTML, arbitrary tags can be used in the XML. Moreover, data and processings (layout, design) can be separately described.

The semantic XML document is realized with an XML-based file format for realizing functions of semantic Web technology. An example of the XML-based file format is the rich site summary (RSS) 1.0 or the real simple syndication (RSS) 0.9-2.0. The RSS is an XML format for describing and distributing a summary of a Website. In other words, the RSS is a text file that briefly marks up a document construction. A document described in the RSS format is called an RSS document or an RSS feed. Specifications of the RSS are being standardized by various companies and organizations. If the data format is standardized for different types of data in Websites, the programmer only needs to interpret the data according to the specification; thus, it is easy to use the data for secondary purposes. Furthermore, Atom is another XML-based file format that has the same functions as the rich site summary (RSS). See http://kanzaki.com/docs/sw/rss.html for a description of RSS (accessed as of Nov. 17, 2004). See http://www.kanzaki.com/docs/sw/atom.html for a description of Atom (accessed as of Nov. 17, 2004).

Each time the network facsimile FX performs a sending/receiving operation, the network facsimile FX creates and saves communication history data 401 as shown in FIG. 4. The sending/receiving operation corresponds to a facsimile sending/receiving operation with another G3 facsimile device through the PSTN, and an e-mail communication operation for exchanging image data by e-mail. A scan-e-mail function is one form of the e-mail communication operation. Specifically, image data acquired by scanning a document is transmitted to a designated destination by e-mail.

The communication history data includes: a file number given to each communication job; a communication mode that indicates whether the corresponding communication is a facsimile sending/receiving operation or an e-mail communication operation; a communication time/date that indicates when the communication is completed; other party data of the other party of communication; communication results of the corresponding communication; and user information of the user who set the communication.

In a multiple destination communication, a plurality of destinations is set. In this case, the other party data is shown in a format of a destination table 402 shown in FIG. 4. The destination table 402 includes the number of destinations and a #k number of destination data.

In a multiple destination communication, the number of communication results corresponds to the number of destinations. In this case, the communication results are shown in a format of a communication result table 403 as shown in FIG. 4. The communication result table 403 includes a #k number of communication results corresponding to the same destinations as those in the destination table 402 in the same order.

According to the present embodiment, the communication history data, the other party data, and the communication results are created as XML data in an XML format. Accordingly, this data can automatically convert/create an HTML file of a transmission history data list page or an individual transmission history data page, an RSS feed, or an Atom feed. When automatically converting the XML data into an HTML file, an RSS feed, or an Atom feed, a corresponding extensible stylesheet language transformations (XSLT) file is applied.

Figure 5:
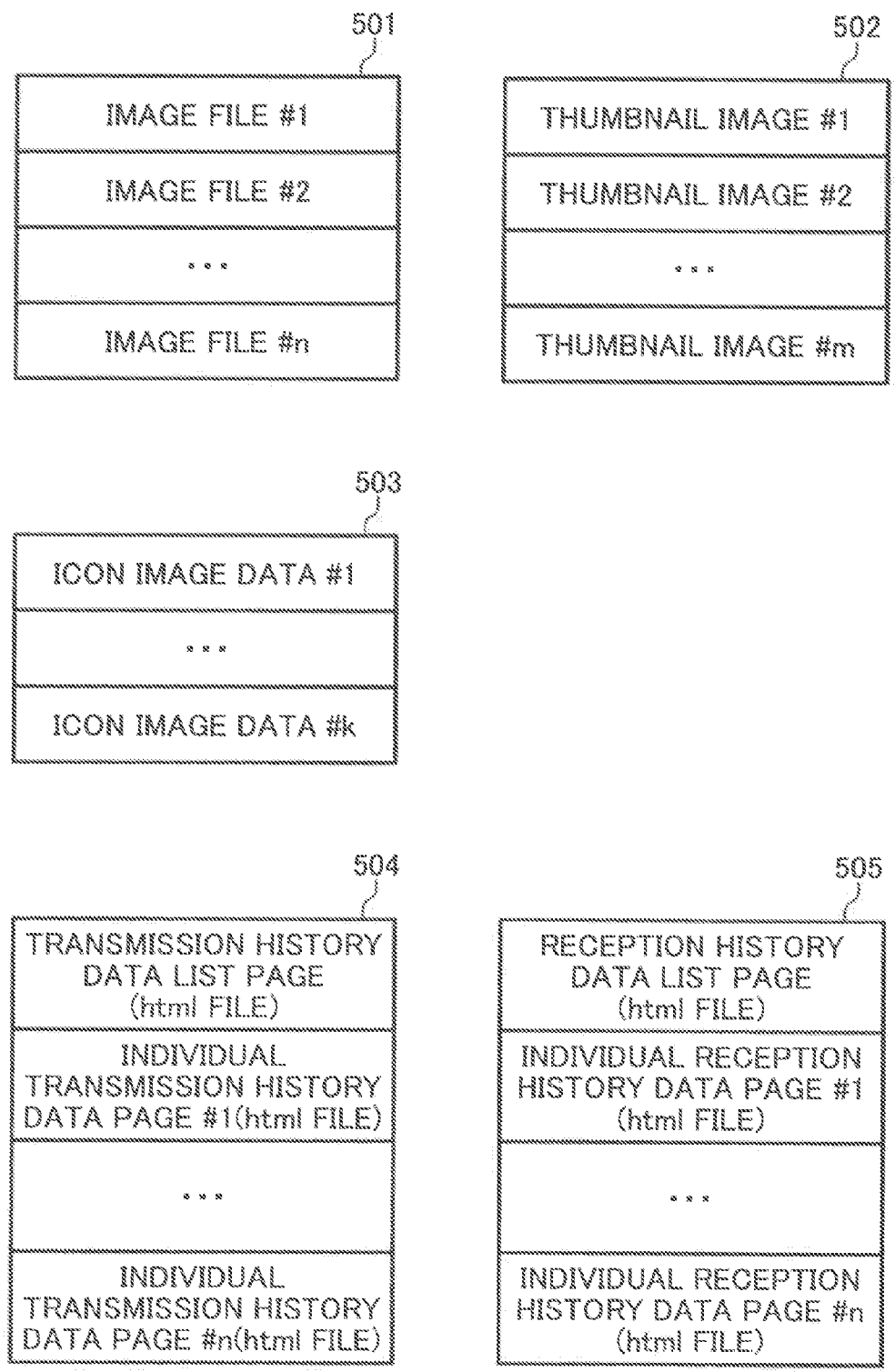
FIG. 5 is a schematic of data stored in an image storing unit.

Block diagrams of data stored in the image storing unit 9 are shown in FIG. 5. All sent/received image data is stored in the image storing unit 9 as image files. Thumbnail images (reduced images) corresponding to the image files are created and used as index images, and are stored in the image storing unit 9 (see 501 and 502 in FIG. 5).

When the network facsimile apparatus FX provides various data to the client device as the HTTP server, icon images are shown on a display screen of the client device so that a user of the client device can see all display items and operation items at a glance. Thus, icon image data is stored in the image storing unit 9 (see 503 in FIG. 5).

Among the communication history data, all data pertaining to sending operations is listed in a transmission history data list page, and individual sending operations are shown in an individual transmission history data page. These pages are created as HTML files and stored in the image storing unit 9 each time a sending operation is completed (see 504 in FIG. 5).

Among the communication history data, all data pertaining to receiving operations is listed in a reception history data list page, and individual sending operations are shown in an individual reception history data page. These pages are created as HTML files and stored in the image storing unit 9 each time a receiving operation is completed (see 505 in FIG. 5).

The present embodiment includes a function of providing the transmission history data list page, the individual transmission history data page, the reception history data list page, and the individual reception history data page as semantic XML documents such as an RSS document or an Atom document.

FIG. 6 is an example of the transmission history data list page and the individual transmission history data page provided as an RSS document (RSS feed). The format of this RSS feed is compliant with RSS 1.0.

An element name beginning with dc (such as dc:date) is defined by the Dublin Core module that is established by the Dublin Core Metadata Initiative (DCMI). The Dublin Core module defines vocabulary for describing bibliographic data of a Web page or a document as metadata. The bibliographic data includes the author, the title, the date and time created, and so forth.

An element name beginning with rdf (such as rdf:li) is defined by the RDF.

In the example shown in FIG. 6, a channel element includes a uniform resource locator (URL) of the network facsimile apparatus FX. To show that the data is transmission history data of the network facsimile apparatus FX, a title element in the channel element includes a character string of "COMMUNICATION HISTORY OF FAX001 [TRANSMISSION]", and a description element in the channel element includes "WILL DISPLAY FAX COMMUNICATION HISTORY [TRANSMISSION]." An image element in the channel element includes a URL of icon image data.

A creator (dc:creator) element in the channel element includes a character string indicating the network facsimile apparatus FX, "FAX001". A date (dc:date) element in the channel element includes the time and date that the RSS feed is created.

An items element includes identification data that identifies at least one individual transmission history data. In this example, there are three item elements. The first two are results of multiple destination communication to two destinations, and the third is a result of transmission to one destination.

A title element in the item element includes a character string for identifying transmission history of the corresponding item element. For example, the title element of the first item element includes "COMMUNICATION HISTORY: TRANSMISSION [001-1]". The number "[001-1]" indicates "[a file number (main number)—element number in the destination table (suffix)]". In other words, "[001-1]" indicates that the transmission history data corresponds to the first destination in the multiple destination communication of a file number 001. Accordingly, it is possible to identify data of different destinations in the same file number.

A title element in the second item element includes "COMMUNICATION HISTORY: TRANSMISSION [001-2]". This indicates that the transmission history data corresponds to the second destination in the multiple destination communication of file number 001.

A title element in the third item element includes "COMMUNICATION HISTORY: TRANSMISSION [002]". This indicates that the transmission history data corresponds to a file number 002.

A link element in the item element includes the URL of a corresponding individual transmission history data page, and a description element includes the contents of the individual transmission history data page.

A subject (dc:subject) element in the item element includes a character string for identifying the corresponding transmission history data. For example, the subject element in the first item element includes "TRANSMISSION RESULT OF FILE NUMBER 001-1". This indicates that the transmission history data corresponds to the first destination in the multiple destination communication of file number 001. The same applies to the subject elements of the second and third item elements.

A publisher element in the item element includes the manufacturer's name of the network facsimile apparatus FX.

A creator (dc:creator) element in the item element includes a user name of the user who commanded the communication operation. In a case of reception history data, the creator element includes identification data of the other party (i.e., the sending side), such as a telephone number. Accordingly, the creator element includes identification data of a user or a terminal that initiated the communication.

A date (dc:date) element in the item element includes the date and time of communication of the corresponding transmission history data. This is to show the user when the transmission operation was performed.

An image element includes a URL of a thumbnail image corresponding to a file number of the transmission history data. A link element includes a URL of image data corresponding to the file number of the transmission history data.

FIGS. 7 to 9 is an example of the transmission history data list page and the individual transmission history data page provided as an Atom document (Atom feed; Atom data). The format of the Atom feed is compliant with version 0.3.

A feed element and an entry element in the Atom format correspond to the channel element and the item element of the RSS format. An attribute rel="alternate" of the Atom format corresponds to the link element of the RSS format. A summary element of the Atom format corresponds to the description element of the RSS format.

A salient feature of the Atom format is that contents with an HTML (XHTML) mark-up can be described as a CDATA section in the content element. According to the present embodiment, a listing of transmission history data is described in a CDATA section. Layout data for the listing can be described in ⌈ ⌉.

The work station devices WS1 to WSn are installed with software (called an RSS aggregator or an RSS reader) for displaying an RSS feed or an Atom feed.

Displays 1001, 1002 in FIG. 10 is an example of the RSS feed of FIG. 6 displayed by an RSS aggregator. The display 1001 and the display 1002 display the same data in different display formats.

In the display 1001, a large pane PA1 on the left side displays a list of title elements of channel elements in a RSS feed registered in the RSS aggregator.

When a user selects a title element (a selected element is framed by dotted lines), a list of item elements in the corresponding RSS feed is displayed in a pane PA2 in the upper right side. This example has three item elements; the title elements in the respective item elements are displayed.

When a user selects one element (the top one) in the pane PA2, the description element of the selected item is displayed in a pane PA3 located blow the pane PA2. An icon IC displayed in the Pane PA3 is operated to "get" corresponding image data.

In the display 1002, the pane PA3 displays the link elements included in the item element. Specifically, contents of the corresponding individual transmission history data page are acquired and displayed.

The Atom feed is displayed similarly to the RSS feed; thus, the description of displaying the Atom feed is omitted.

When the RSS aggregator is booted, the RSS aggregator accesses the URL of the RSS feed registered first, and acquires data of the RSS feed from the corresponding network facsimile apparatus FX.

For example, the RSS aggregator executes a command of http://fax001.abc.co.jp/history/transmission/history?xml=rss1.0&usercode=001, in order to acquire an RSS feed of a user with a user code 001, in the format of RSS 1.0.

Specifically, the HTTP is applied, and the RSS aggregator issues a command of GET/history/transmission/history?xml=rss1.0&usercode=001 to the network facsimile FX of fax001.abc.co.jp.

The network facsimile FX then acquires all transmission history data of the user of the user code 001 from the stored communication history data. In this example, the format of RSS 1.0 is applied, as designated. The RSS 2.0 or the Atom format can be designated if desired.

When the RSS feed is created, the network facsimile apparatus FX sends the RSS feed to the workstation device WS1 to WSn requesting the RSS feed.

When the RSS feed is received, the RSS aggregator displays the RSS feed as described with FIG. 10.

The RSS aggregator executes a command of http://fax001.abc.co.jp/history/transmission/history?xml=rss1.0, in order to acquire transmission history data of all users. To acquire the RSS feed in the RSS 2.0 format, the end of the command becomes xml=rss2.0. Further, to acquire the RSS feed in the Atom format, the end of the command becomes xml=atom.

The network facsimile apparatus FX then acquires all transmission history data from the stored communication history data, creates the RSS feed, and sends the RSS feed to the workstation device WS1 to WSn requesting the RSS feed.

According to the present embodiment, communication history data is notified to another device as a semantic XML document, so that each element can be used as XML data. Thus, it is easy to use the data for secondary purposes. Moreover, the communication history data can be displayed in various formats.

Furthermore, the data is displayed as text in the XML file, but a user can easily acquire more details by referring to a linked URL. Thus, the data is visually expressive.

The data in the XML file (subject data and description data) is stored as text. Thus, various types of information can be transmitted easily.

If the data is communication history, the time/date of a facsimile communication can be included in the data element in the XML file, instead of the time/date that the XML file is created. Thus, the order of the history data can be retained when it is displayed.

Furthermore, if the data is communication history, the user name (user code) of the user that initiated the facsimile communication can be included in the creator element of the XML file, instead of a name of a communication device. Thus, the history data can be used more practically.

A URL is given to each image of the image data. Thus, a user can view details of the history data with thumbnail images.

When an Atom feed is used, layout data of the HTML is stored, so that a design of a Web page can be notified. Thus, expressiveness the data is enhanced.

Figure 11:
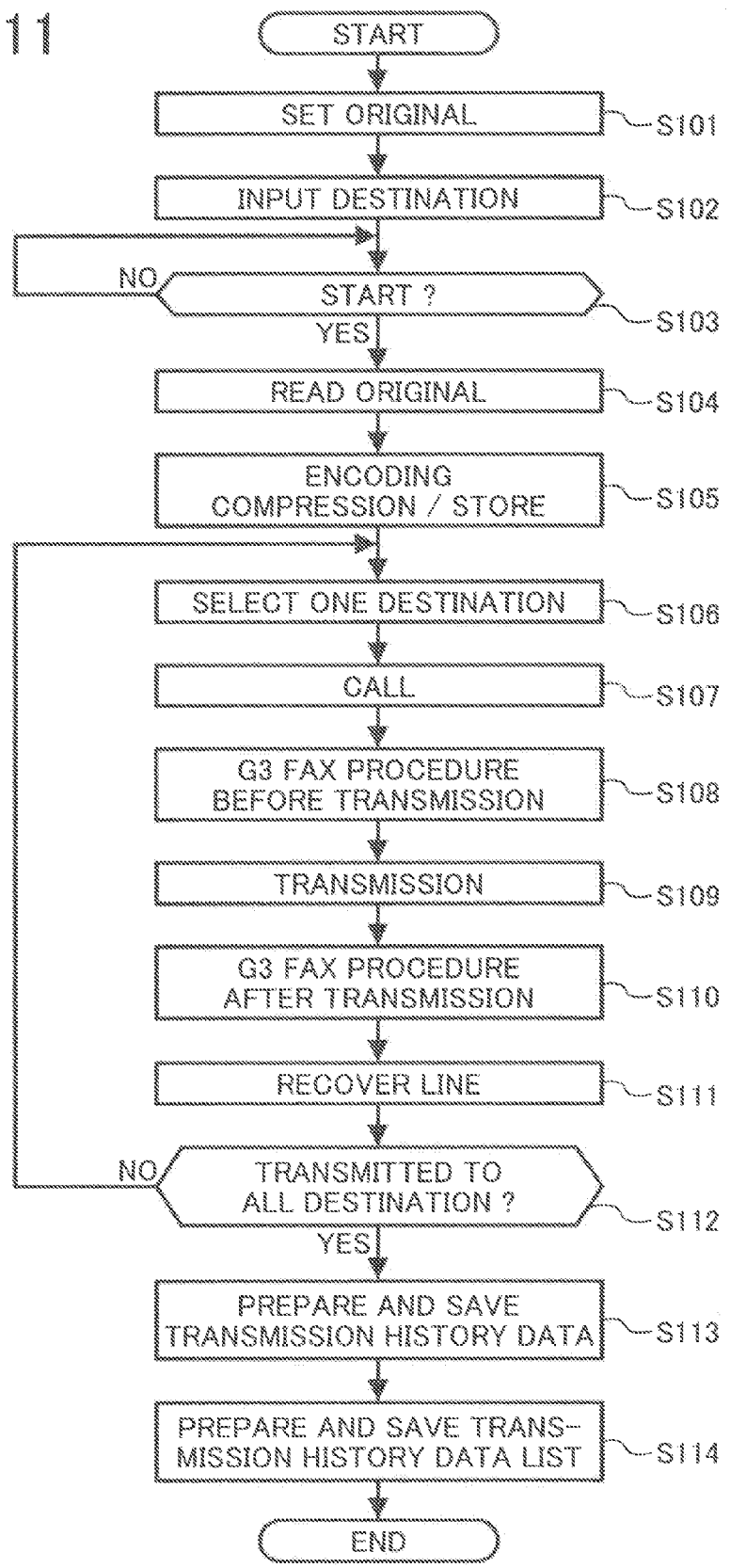
FIG. 11 is a flowchart of a transmission operation performed by the network facsimile apparatus FX.

FIG. 11 is a flowchart of a transmission operation performed by the network facsimile apparatus FX. When a user sets an original in the scanner 5 (step S101), the user operates the operation display unit 7 to input at least one destination (step S102), and presses a start key (not shown) of the operation display unit 7 to start the transmission operation (Yes at step S103).

The scanner 5 reads an image of the original set in the scanner 5 (step S104). The encode/decode unit 8 encodes and compresses image data acquired at step S104, and stores the encoded/compressed image data in the image storing unit 9 (step S105). At this step, thumbnail image data corresponding to the image data is created and stored in the image storing unit 9.

The network facsimile apparatus FX selects one of the designated destinations (step S106), calls the selected designation through the PSTN (step S107), performs a specific G3 fax procedure before transmission (step S108), and transmits the stored image data to the destination (step S109).

When transmission of the image data is completed, the network facsimile apparatus FX performs a specific G3 fax procedure after transmission (step S110), and recovers the line (step S111). The network facsimile apparatus FX determines whether transmissions to all destinations are completed (step S112). If not (No at step S112), the system control returns to step S106, and the network facsimile apparatus FX performs the transmission operation for a remaining destination.

If transmissions to all destinations are completed (Yes at step S112), the network facsimile apparatus FX creates and stores transmission history data (step S113), creates and stores a transmission history data list (step S114), and ends the operation.

Figure 12:
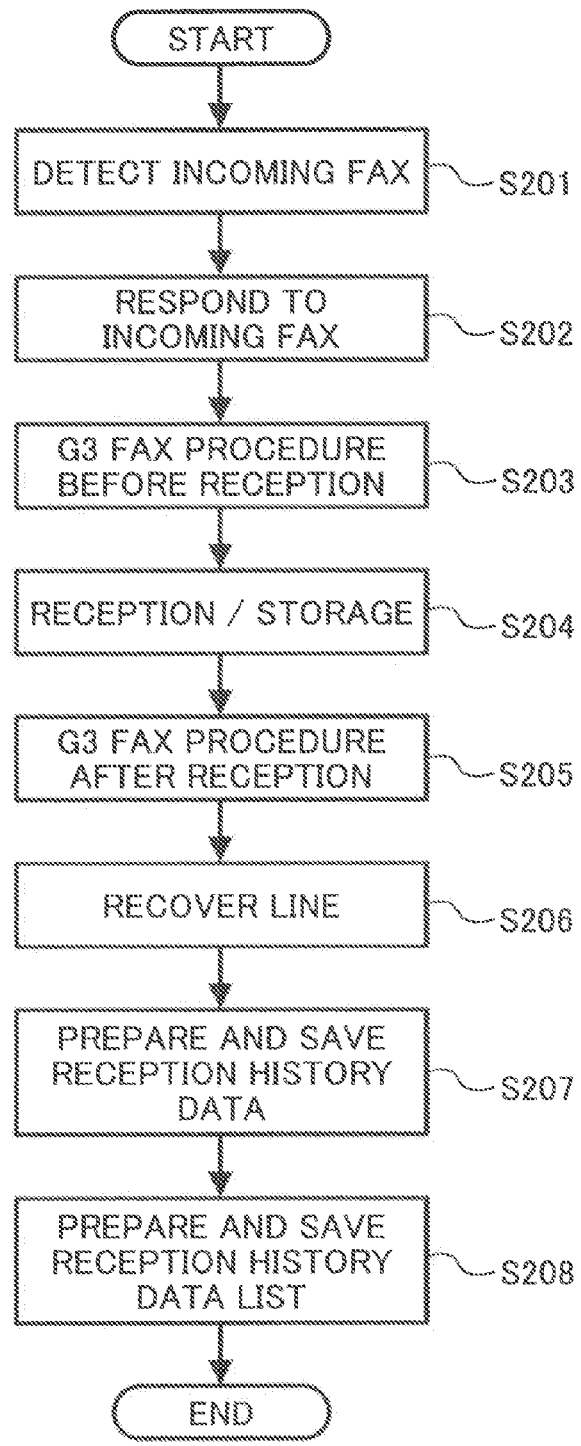
FIG. 12 is a flowchart of a reception operation performed by the network facsimile apparatus FX.

FIG. 12 is a flowchart of a reception operation performed by the network facsimile apparatus FX. When an incoming fax is detected (step S201), the network facsimile apparatus FX responds to the incoming fax (step S202), performs a specific G3 fax procedure before reception (step S203), receives image data, and stores the image data in the image storing unit 9 (step S204). At this step, thumbnail image data corresponding to the image data is created and stored in the image storing unit 9.

When reception of the image data is completed, the network facsimile apparatus FX performs a specific G3 fax procedure after reception (step S205), and recovers the line (step S206). The network facsimile apparatus FX creates and stores reception history data (step S207), creates and stores a reception history data list (step S208), and ends the operation.

Figure 13:
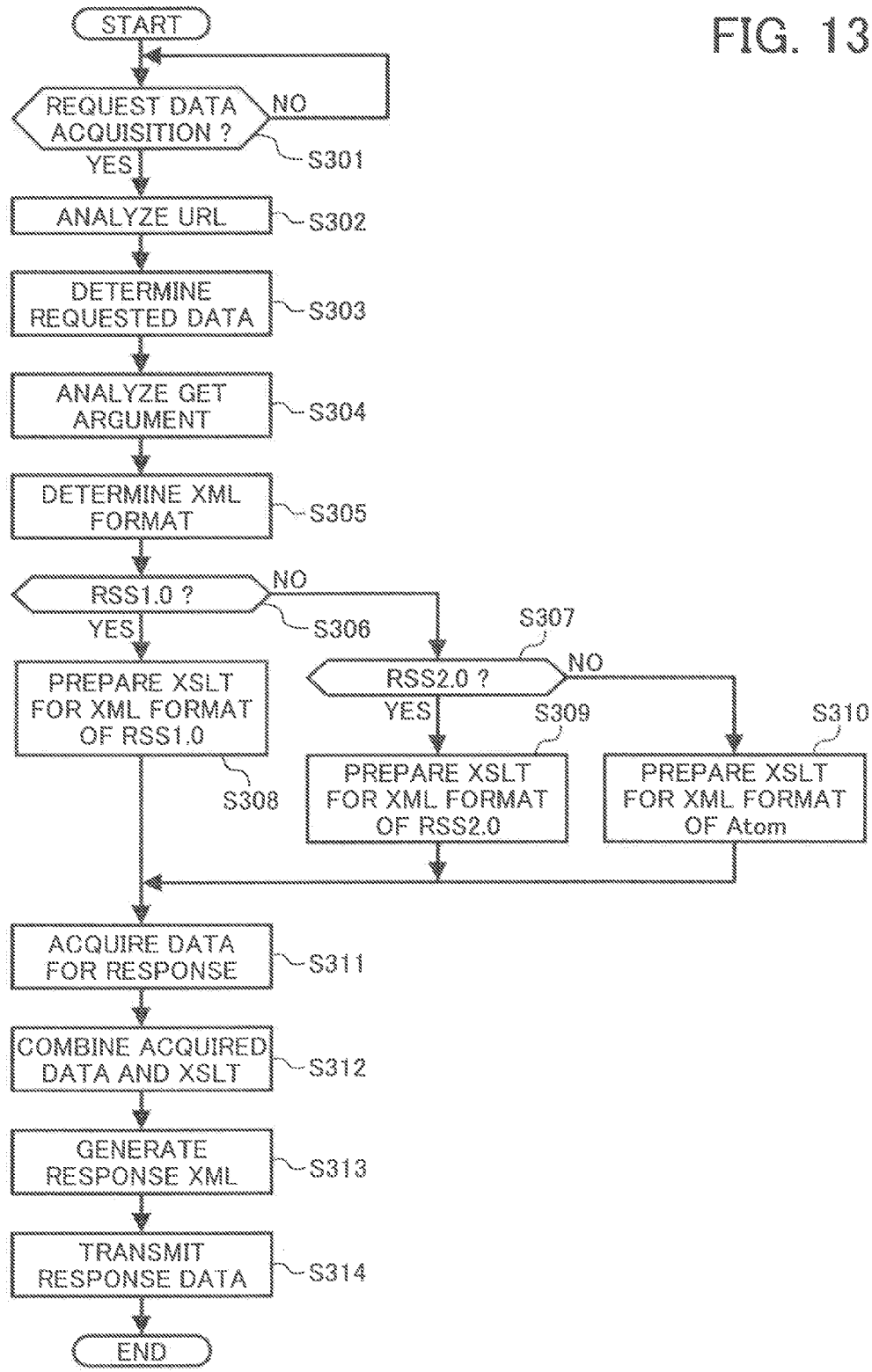
FIG. 13 is a flowchart of a processing performed by the network facsimile apparatus FX operating as an HTTP server.

FIG. 13 is a flowchart of a processing performed by the network facsimile apparatus FX when an HTTP connection request is received through the LAN. In this case, the network facsimile apparatus FX functions as an HTTP server.

When a request to acquire data is received (Yes at step S301), the network facsimile apparatus FX analyzes the received URL (step S302), and determines which data is being requested (step S303). The network facsimile apparatus FX analyzes an argument of a GET command (step S304), examines the designated XML format (step S306), and determines whether the designated XML format is RSS 1.0, RSS 2.0, or Atom (steps 306, 307).

When the designated XML format is RSS 1.0 (Yes at step S306), the network facsimile apparatus FX creates an XSLT file corresponding to the RSS 1.0 XML format (step S308). When the designated XML format is RSS 2.0 (Yes at step S307), the network facsimile apparatus FX creates an XSLT file corresponding to the RSS 2.0 XML format (step S309). When the designated XML format is Atom (No at step S307), the network facsimile apparatus FX creates an XSLT file corresponding to the Atom XML format (step S310).

The network facsimile apparatus FX acquires the XML data determined at step S303 (step S311), combines the XML data read at step S311 and the XSLT file created at any one of steps S308 to S310 (step S312), creates response XML data (RSS feed or Atom feed) (step S313), and transmits the response XML data created at step S313 to the device making the request (step S314).

According to the first embodiment, the RSS feed or the Atom feed is used as the semantic XML document. However, any other data format can be similarly used.

According to the first embodiment, the present invention is applied to communication history data. However, the present invention can be similarly applied to other data, such as machine-setting data, etc.

Search results of device data can be acquired in a semantic XML document. Thus, a user can easily use the data for secondary purposes, and easily display the data by using a tool. This enhances a degree of freedom in utilizing the data.

Figure 14:
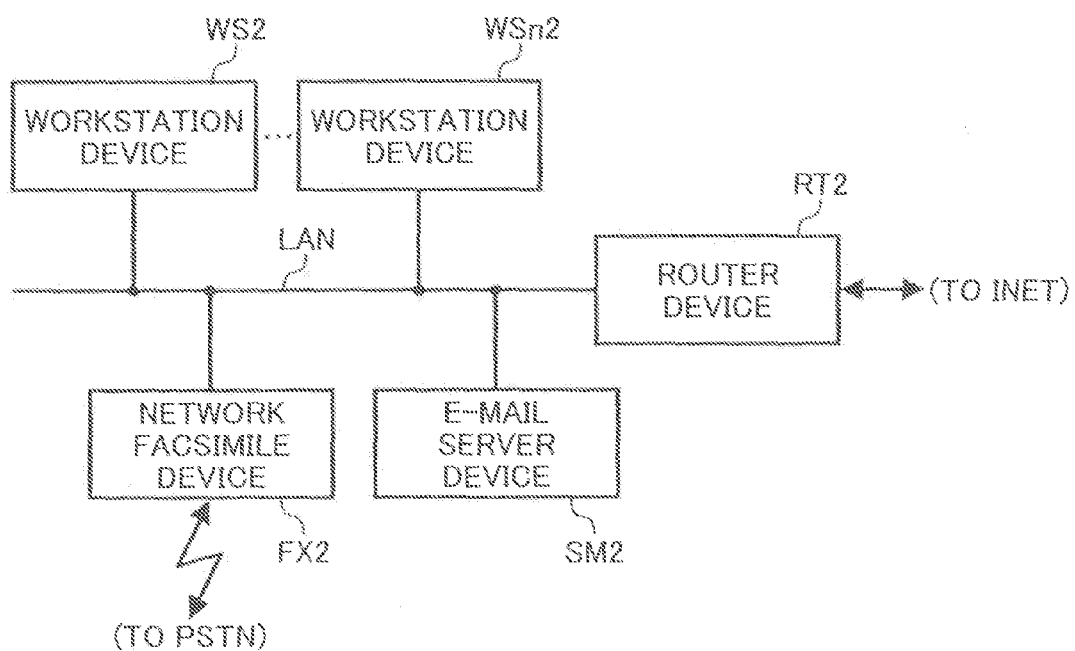
FIG. 14 is a block diagram of a network system according to a second embodiment of the present invention.
Figure 15:
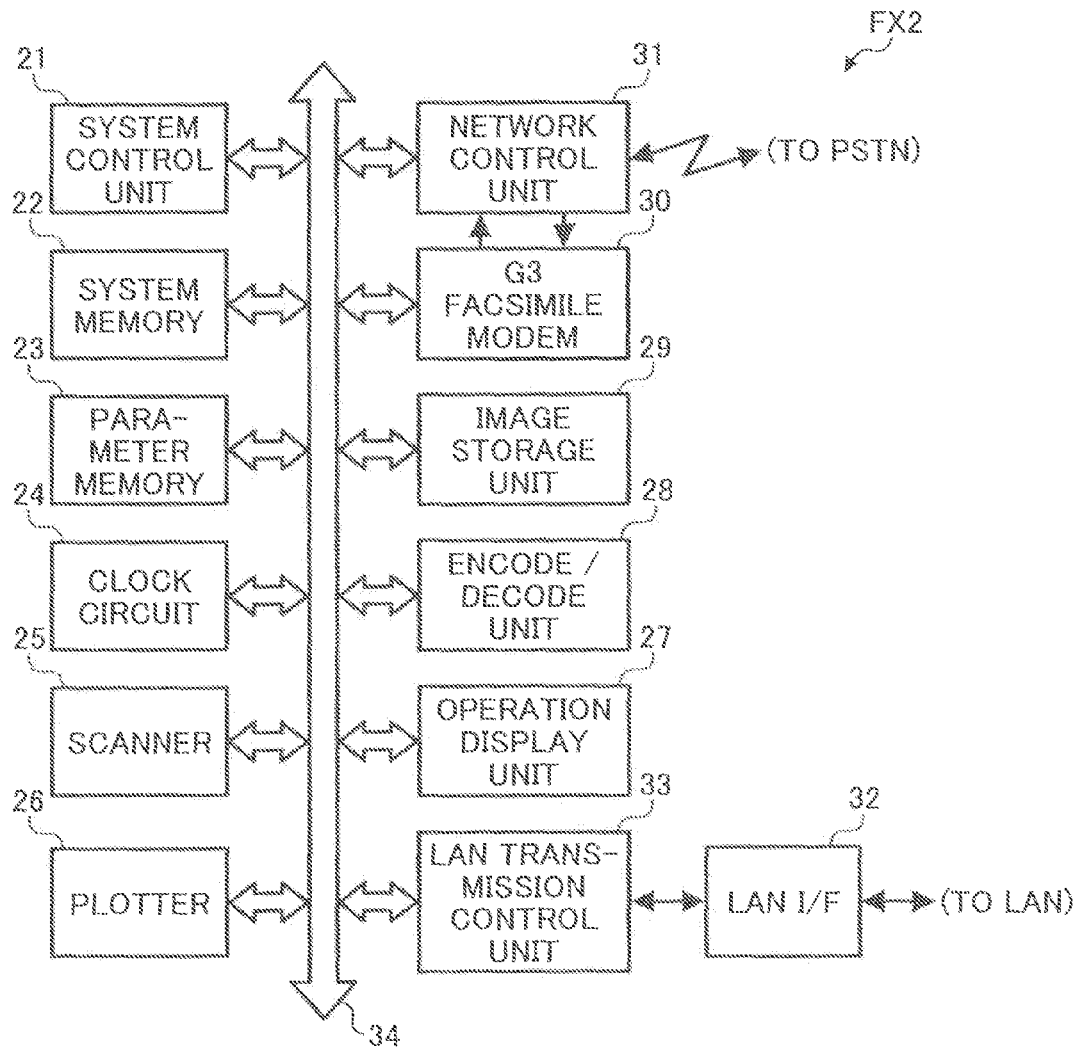
FIG. 15 is a block diagram of a network facsimile apparatus FX2 shown in FIG. 14.

FIG. 14 is a block diagram of a network system according to a second embodiment of the present invention. FIG. 15 is a block diagram of a network facsimile apparatus FX2 shown in FIG. 14.

The network system shown in FIG. 14 and the configuration of the network facsimile apparatus FX2 shown in FIG. 15 are the same as those according to the first embodiment shown in FIG. 1 and FIG. 2; thus, overlapping descriptions are omitted. However, the components are denoted by different reference numerals.

Figure 16:
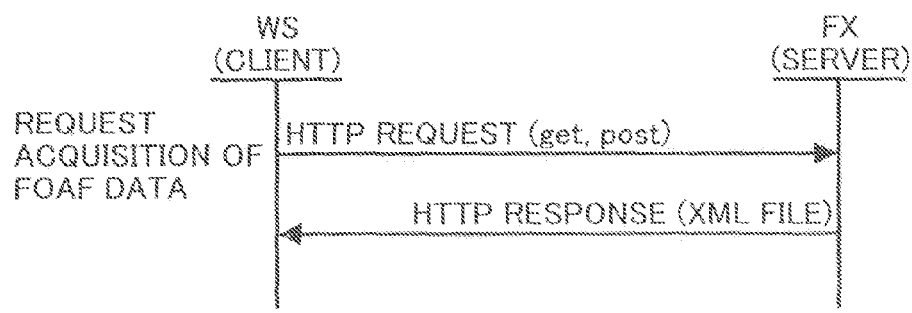
FIG. 16 is a time chart showing communication by HTTP according to the second embodiment.

FIG. 16 is a time chart showing communication by the HTTP, according to the second embodiment. The difference from the first embodiment shown in FIG. 3 is that the network facsimile apparatus FX2 provides Friend-of-A-Friend (FOAF) data as a semantic XML document to the client device.

The present embodiment uses the FOAF to provide data of a terminal or a related terminal to another terminal. The FOAF vocabulary has been established for disclosing/sharing data of a person (oneself or a friend, etc.) in a standardized format. The FOAF is being standardized by the FOAF project. For details, see http://www.foaf-project.org/ (accessed as of Nov. 17, 2004).

More details about the FOAF can be found in the following: http://www.kanzaki.com/docs/sw/foaf.html (expressing an acquaintance network with meta data), http://www-6.ibm.com/jp/developerworks/xml/020906/j_x-foaf.html (searching friends by XML and RDF) (accessed as of Nov. 17, 2004).

The salient feature of the FOAF is that it not only expresses data on a particular individual, but also "connections" with other people. The present embodiment extended this concept from relationships between people to relationships between communication terminal devices. The communication terminal device can be the network facsimile apparatus FX2 according to the present embodiment, a composite machine (combining functions of a copier, a fax machine, a scanner), and so forth.

Figure 17:
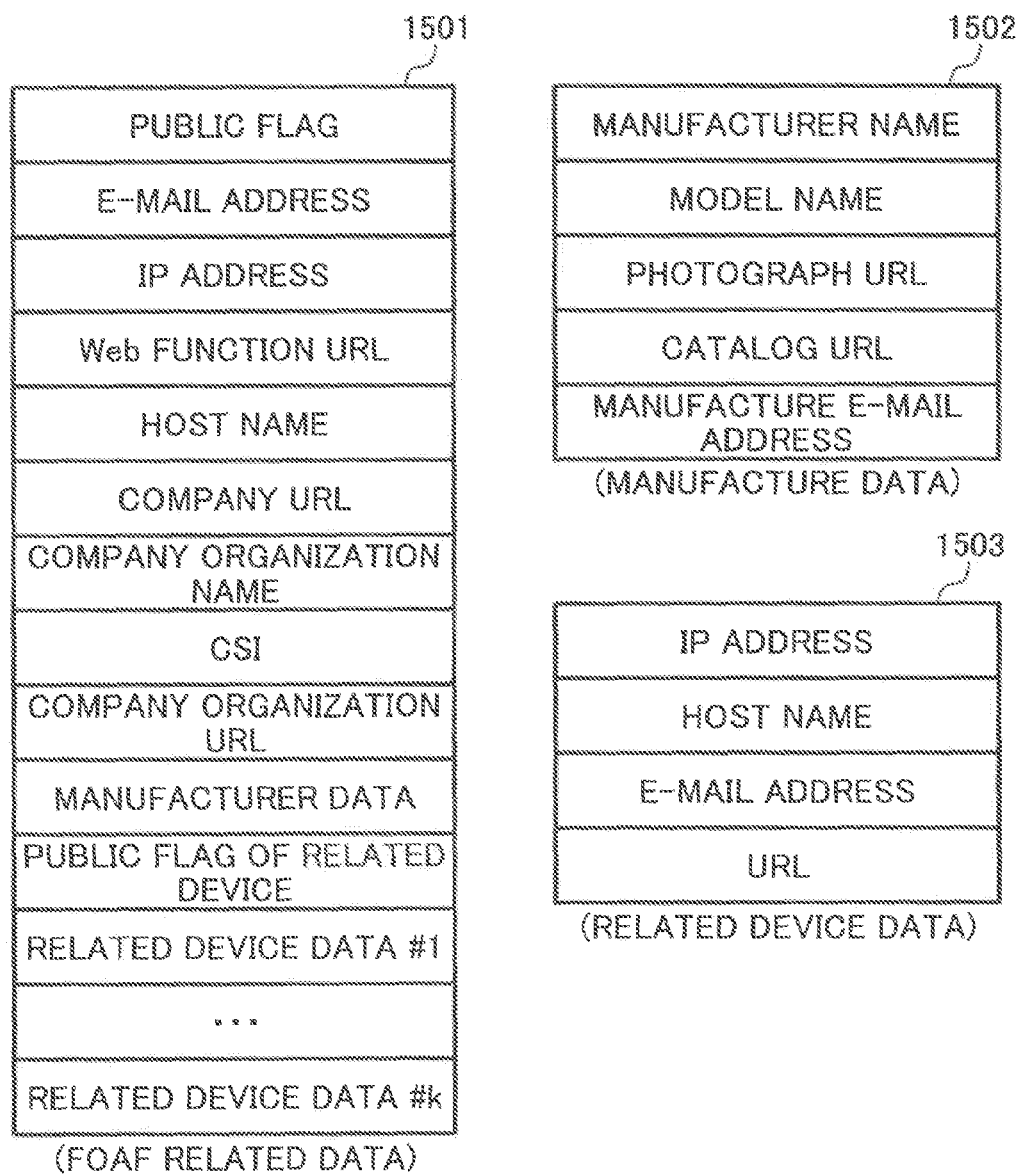
FIG. 17 is a schematic of FOAF related data, manufacturer data, and related device data.

For example, a terminal stores FOAF related data 1501 as shown in FIG. 17. The FOAF related data 1501 includes: a public flag to designate whether the FOAF data can be open to public; an e-mail address of the terminal; the IP address of the terminal, a Web function URL of a Web page of the terminal; a host name of the terminal; a company URL of a Web page of a company that locals the terminal, a company organization name of an organization in the company where the terminal is installed; a company organization URL of a Web page of the organization; a called subscriber identification (CSI) registered in the terminal; manufacturer data of the manufacturer of the terminal; a related device public flag to indicate whether to include data of a related device in the FOAF data; at least one related device data #1 to #k registered as data of a device related to the terminal.

Each element in the FOAF related data 1501 can be registered by creating a FOAF related data table. Another method of forming the FOAF related data 1501 is to use data that is already registered for other functions. For example, the FOAF related data 1501 can be formed by using: an e-mail address registered in an e-mail communication function; an IP address acquired by the LAN transmission control unit 13 by using a dynamic host configuration protocol (DHCP) client function; and a CSI set in a G3 facsimile communication function.

Not all elements of the FOAF related data 1501 are already registered in the terminal. In this case, only the registered data is acquired to form the FOAF related data 1501.

Manufacturer data 1502 further includes a name of the manufacturer, a machine model name, a photograph URL for acquiring a photograph of the terminal's model that is disclosed by the manufacturer, a catalogue URL for acquiring a catalogue of terminal's model that is disclosed by the manufacturer, and a manufacturer's e-mail address for obtaining support.

Related device data 1503 further includes an IP address, a host name, an e-mail address, and a URL of a related device. The URL is used to access a FOAF file of the related device.

The network facsimile apparatus FX2 has a Web page (Web function URL) from which device data can be accessed with the Web server function.

Figure 18:
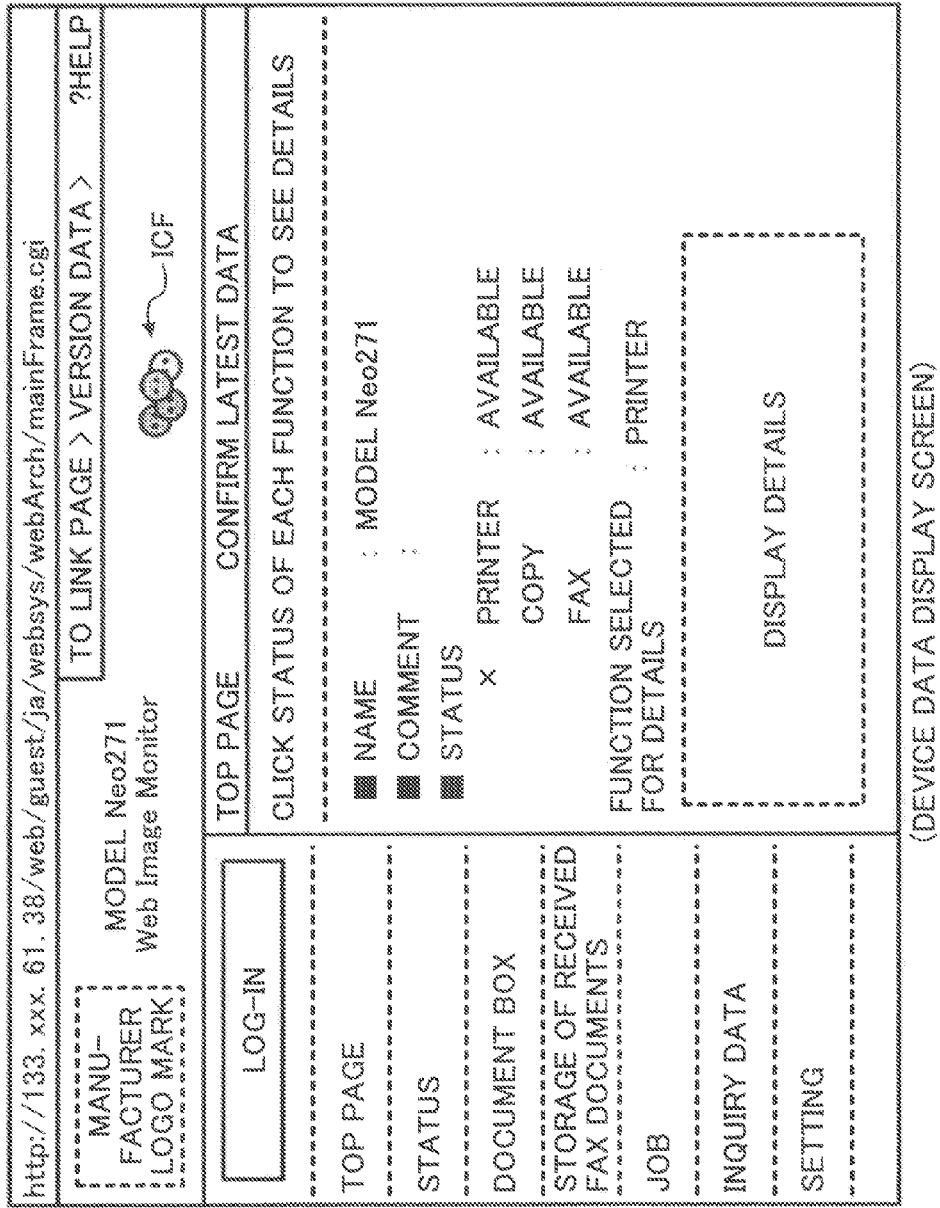
FIG. 18 is an example of a front page of a Web page of the network facsimile apparatus FX2.

FIG. 18 is an example of a front page of the Web page. A URL of the Web page is shown in the top pane DP1. A pane DP2 below the DP1 shows a manufacturer logo, a machine model name, related links, and an icon of internet connection firewall (ICF) for acquiring FOAF data. A pane DP3 at the bottom left side shows a list of items. The largest pane DP4 at the bottom right side shows contents of a selected item.

The important point of this Web page is that FOAF data can be acquired by clicking on the icon ICF. However, when the public flag of the FOAF related data is set as "cannot open to public", the icon ICF is not shown, or an error message is displayed when clicked.

When the public flag of the FOAF related data is set as "can open to public", the icon ICF is shown. When a user clicks on the icon ICF, FOAF data is displayed as shown in FIG. 19 (XML format; excluding header data and trail data).

In the FOAF data shown in FIG. 19, data elements are set for all items, and two sets of related device data are registered.

An element beginning with foaf (such as foaf:Person) is defined by the FOAF module, and an element beginning with rdf (rdf:RDF) is defined by the RDF.

A "domain" refers to a set of data located in between foaf tags. For example, data between <foaf:Person> and </foaf:Person>, is called a Person domain. Moreover, each content set in each element registered as the FOAF related data is referred to as a value.

In FIG. 19, lines 6 to 24 include the terminal's local data, a knows domain in lines 25 to 32 includes data of a first related device (related device data #1), and a knows domain in lines 33 to 40 includes data of a second related device (related device data #2).

In the terminal's local data, an IP address is set in line 6 in <foaf:name>133.xxx.61.102</foaf:name>, a host name is set in line 7 in <foaf:nick>gw_target12</foaf:nick>, an e-mail address is set in line 8 in <foaf:mbox rdf:resource="mailto: gw_target12@dmn01. userworkplace.co.jp"/>, a Web function URL is set in line 9 in <foaf:homepage rdf: resource="http://133.xxx.61.102/web/guest/ja/websys/ webArch/mainFrame.cgi"/>, and a CSI (phone number) is set in line 10 in <foaf:phone rdf: resource="tel:0123-456-7890"/>.

A company URL is set in line 11 in <foaf:workplaceHomepage rdf:resource="http://www.userworkplace.co.jp/"/>.

Lines 12 to 15 include data of the company organization (Organization domain). A company organization is set in line 13 in <foaf:name>UserWorkplaceName</foaf:name>, and a company organization URL is set in line 14 in <foaf:homepage rdf:resource="http://www.userworkplace.co.jp/ project/"/>.

Lines 16 to 24 include data of the manufacturer (maker domain). A manufacturer name is set in line 18 in <foaf: name>MAKER</foaf:name>, a model name is set in line 19 in <foaf:nick>MODEL Neo271</foaf:nick>, a photograph URL is set in line 20 in <foaf:depiction rdf:resource="http:// www.MAKER.co.jp/MODEL/neo/271/img/index_5. jpg"/>, a catalogue URL is set in line 21 in <foaf:homepage rdf: resource="http://www.MAKER.co.jp/MODEL/neo/ 271/"/

>, and a manufacturer's e-mail address is set in line 22 in <foaf:mbox rdf:resource="mailto:suppport@MAKER.co.jp"/>.

In the knows domain, an IP address is set in a name element (lines 27, 35), a host name is set in a nick element (lines 28, 36), an e-mail address is set in an mbox element (lines 29, 37), and a URL is set in a seeAlso element (lines 30, 38).

Figure 20:
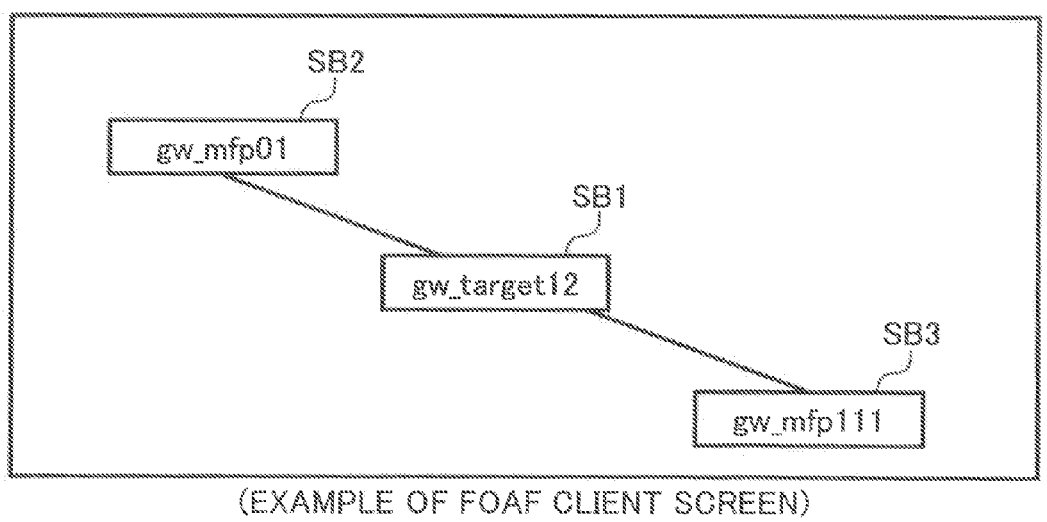
FIG. 20 is a schematic of a screen displayed by an FOAF client.

When the FOAF data is received at a terminal, an FOAF client displays a screen as shown in FIG. 20. The screen shows a graph describing relationships between the network facsimile apparatus FX2 requesting the FOAF data and other related terminals.

In the example shown in FIG. 20, a symbol SB1 in the center shows a nickname (host name) of a terminal that requested the FOAF data. A symbol SB2 at the upper left side shows a nickname of a first terminal registered in the knows domain of the received FOAF data. A symbol SB3 at the lower right side shows a nickname of a second terminal registered in the knows domain of the received FOAF data. The symbol SB2 and the symbol SB3 are connected to the symbol SB1 by lines indicating relationships.

By acquiring the FOAF data, a user of a terminal can find out the relationships between terminals of users or data-collecting agents (automatic machine, robot software etc.). Accordingly, the user can see this information when setting a communication channel, etc. The FOAF data is very convenient because it includes detailed data of the company/organization to which a terminal belongs. This data can be collected and processed (such as filtering, etc.) to extract a terminal according to a specific condition.

Data of different devices can be disclosed and shared in a standardized data format. Thus, the data can be used to show a relationship between devices. Moreover, because the data is in XML format, the data can be easily used for secondary purposes.

Figure 21:
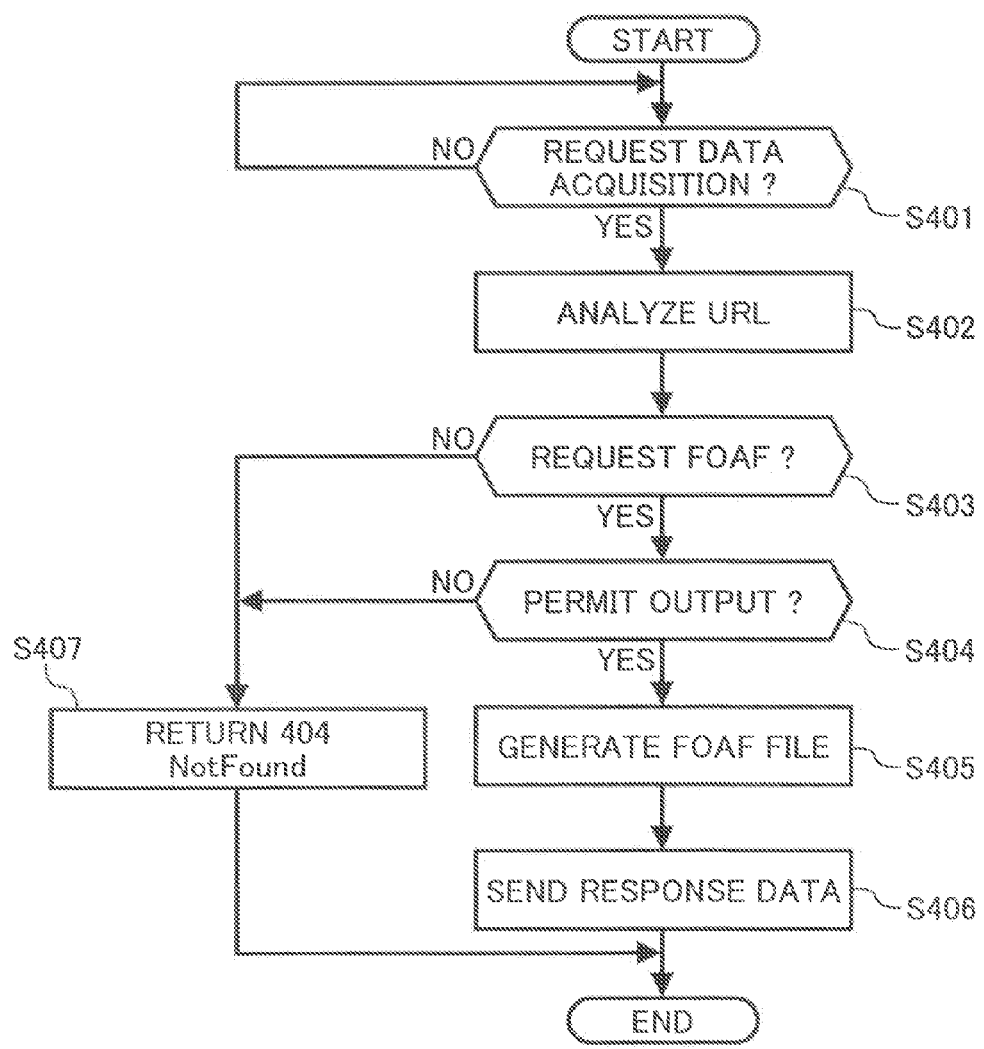
FIG. 21 is a flowchart of a processing performed by the network facsimile apparatus FX2 when a request to acquire FOAF data is received.

FIG. 21 is a flowchart of a processing performed by the network facsimile apparatus FX2 when a request to acquire FOAF data is received.

When a request to acquire data is received (Yes at step S401), the network facsimile apparatus FX2 analyzes the received URL (step S402), and determines whether the request is an FOAF request (step S403).

When the request is an FOAF request (Yes at step S403), the network facsimile apparatus FX2 checks whether the public flag is set as "can open to public" (step S404). When the public flag is set as "can open to public" (Yes at step S404), the network facsimile apparatus FX2 creates an FOAF data file based on FOAF related data (step S405), and sends the FOAF data file as response data to the terminal that made the request (step S406).

When the public flag is set as "cannot open to public" (No at step S404), or when the request is not an FOAF request (No at step S403), the network facsimile apparatus FX2 returns an error message "404 NotFound" (step S407).

Figure 22:
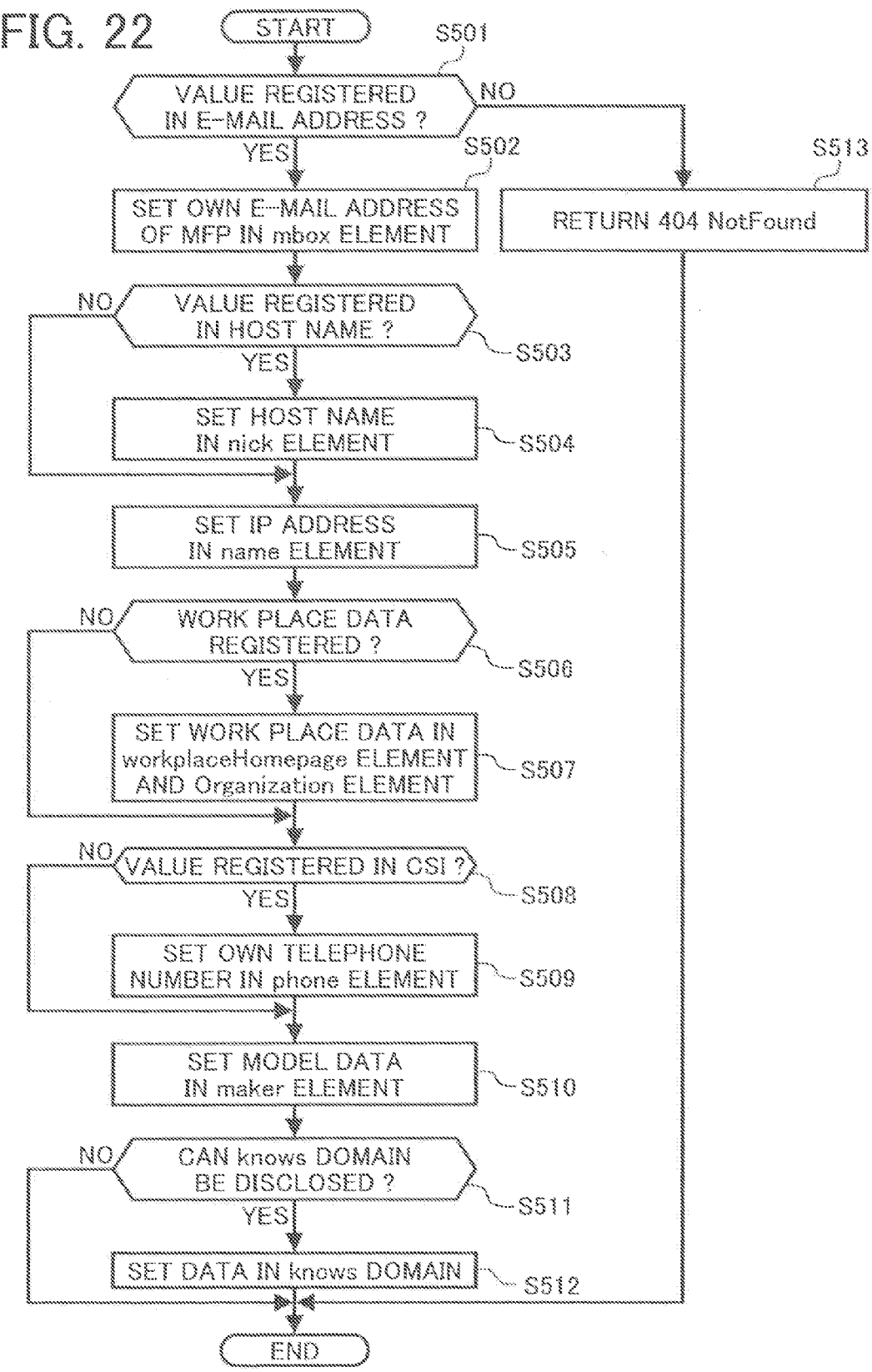
FIG. 22 is a flowchart of a processing performed by the network facsimile apparatus FX2 to create FOAF data.

FIG. 22 is a processing performed by the network facsimile apparatus FX2 to create FOAF data. The network facsimile apparatus FX2 checks whether a valid value is set as an e-mail address in the FOAF related data (step S501). If there is (Yes at step S501), the network facsimile apparatus FX2 sets its local e-mail address of a multifunction peripheral (MFP) in a mbox element in a Person domain (step S502). The network facsimile apparatus FX2 checks whether a valid value is set as a host name in the FOAF related data (step S503). If there is (Yes at step S503), the network facsimile apparatus FX2 sets the host name in a nick element in the Person domain (step S504). When a valid value is not set as a host name (No at step S503), step S504 is not performed; thus, the nick element in the Person domain is left empty.

The network facsimile apparatus FX2 sets a value of an IP address of the FOAF related data in the name element in the Person domain (step S505).

The network facsimile apparatus FX2 checks whether workplace data such as a company name is registered in the FOAF related data (step S506). If there is (Yes at step S506), the network facsimile apparatus FX2 sets a value of a company URL in a workplaceHomepage element in the Person domain, and a company organization name and a company organization URL, etc., in the Organization element (step S507). If workplace data is not registered (No at step S506), step S507 is not performed; thus, workplace data is not set in the FOAF data.

The network facsimile apparatus FX2 checks whether a value is registered for a CSI in the FOAF related data (step S508). If there is, the network facsimile apparatus FX2 sets the value of the CSI in the FOAF related data in a phone element in the Person domain (step S509). When a value is not registered for a CSI (No at step S508), step S509 is not performed.

The network facsimile apparatus FX2 sets manufacture data in the FOAF related data in each element under a maker element in the Person domain (step S510). Specifically, a value of a model name is set in a name element, a value of a photograph URL is set in a depiction element, a value of a catalogue URL is set in a homepage element, and a manufacturer's e-mail address is set in an mbox element.

The network facsimile apparatus FX2 checks whether a value of a public flag of a related device is set as "can open to public" (step S511). If it is (Yes at step S511), values of the related device data are set in each element in a knows domain (step S512). If the public flag of a related device is set as "cannot open to public" (No at step S511), step S512 is not performed; thus related device data is not set in the FOAF data.

When a valid value is not set as an e-mail address in the FOAF related data (No at step S501), the network facsimile apparatus FX2 returns an error message "404 NotFound" (step S513). Thus, when an e-mail address is not registered in the network facsimile apparatus FX2, the network facsimile apparatus FX2 does not respond to an FOAF data request.

Terminal related data registered in network communication apparatuses can be collected in an FOAF format. Thus, data of each network communication apparatus and their relationships can be acquired, and the collected data can be used for secondary purposes.

Figure 23:
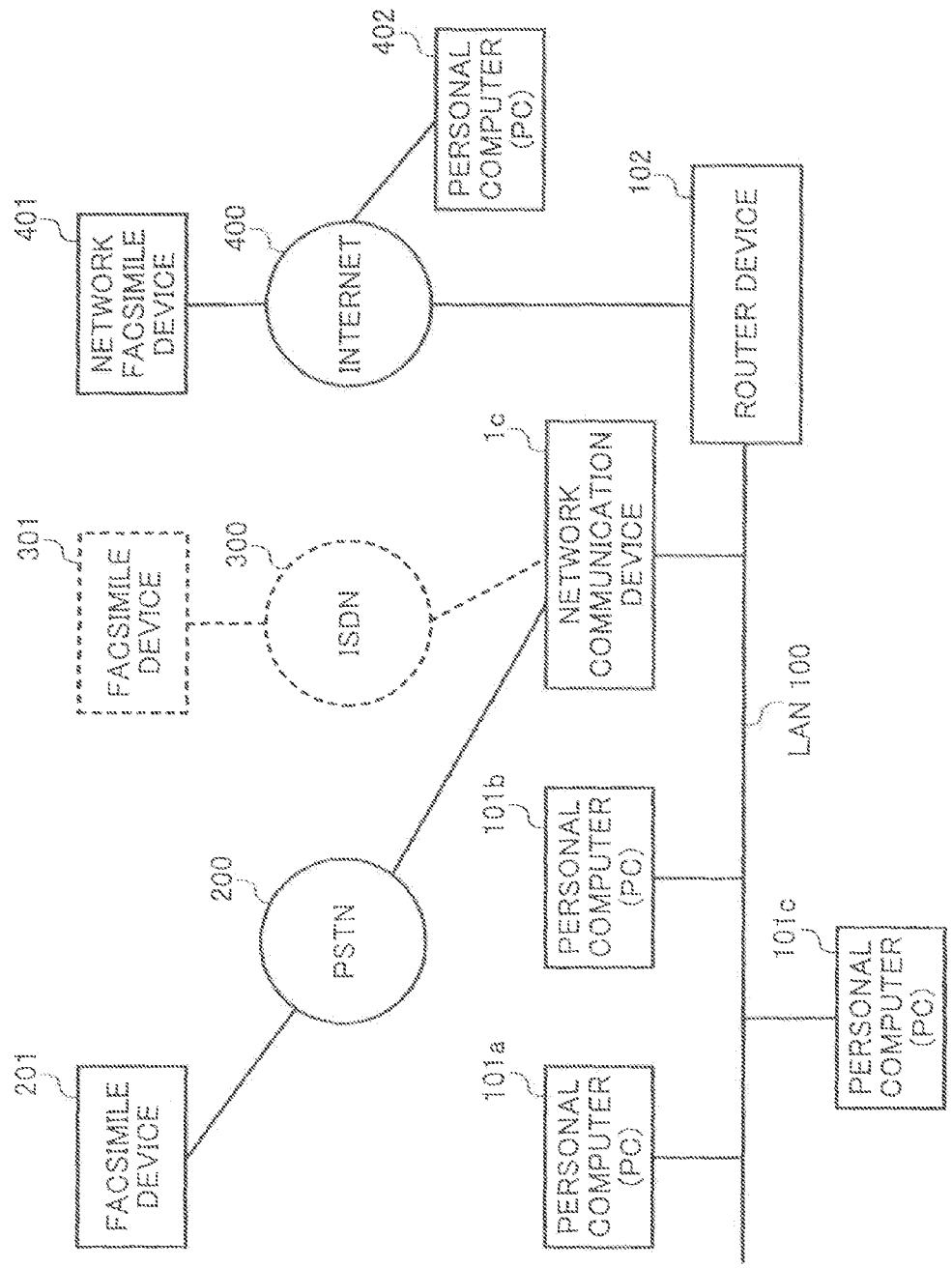
FIG. 23 is a diagram of a system configuration including a network communication apparatus according to a third embodiment of the present invention.

FIG. 23 is a diagram of a system configuration including a network communication apparatus 1*c* according to a third embodiment of the present invention. The network communication apparatus 1*c* exchanges image data with a facsimile device 201 through a PSTN 200. If the network communication apparatus 1*c* has an interface for an integrated services digital network (ISDN) 300, the network communication apparatus 1*c* can exchange image data with a facsimile device 301 through the ISDN 300 (however, this is not included according to the present embodiment). The network communication apparatus 1*c* is connected to a LAN 100, and can exchange image with personal computers (PC) 101*a*, 101*b*, 101*c*, and a router device 102. The network communication apparatus 1*c* is connected to the Internet 400 through the router device 102 that converts packets. Through the Internet 400, the network communication apparatus 1*c* can exchange image data with a PC 402 by an e-mail, and exchange image data with a network facsimile apparatus 401 by performing real-time network facsimile communication compliant with the International Telecommunication Union Telecommunication Standardization Sector (ITU-T) Recommendation T.38.

In other words, the network communication apparatus 1c is a composite machine including functions of a regular facsimile device connected to a public line, a network facsimile apparatus, a scanner for the PC 101 etc., a printer for the 101 etc., and a copier.

Figure 24:
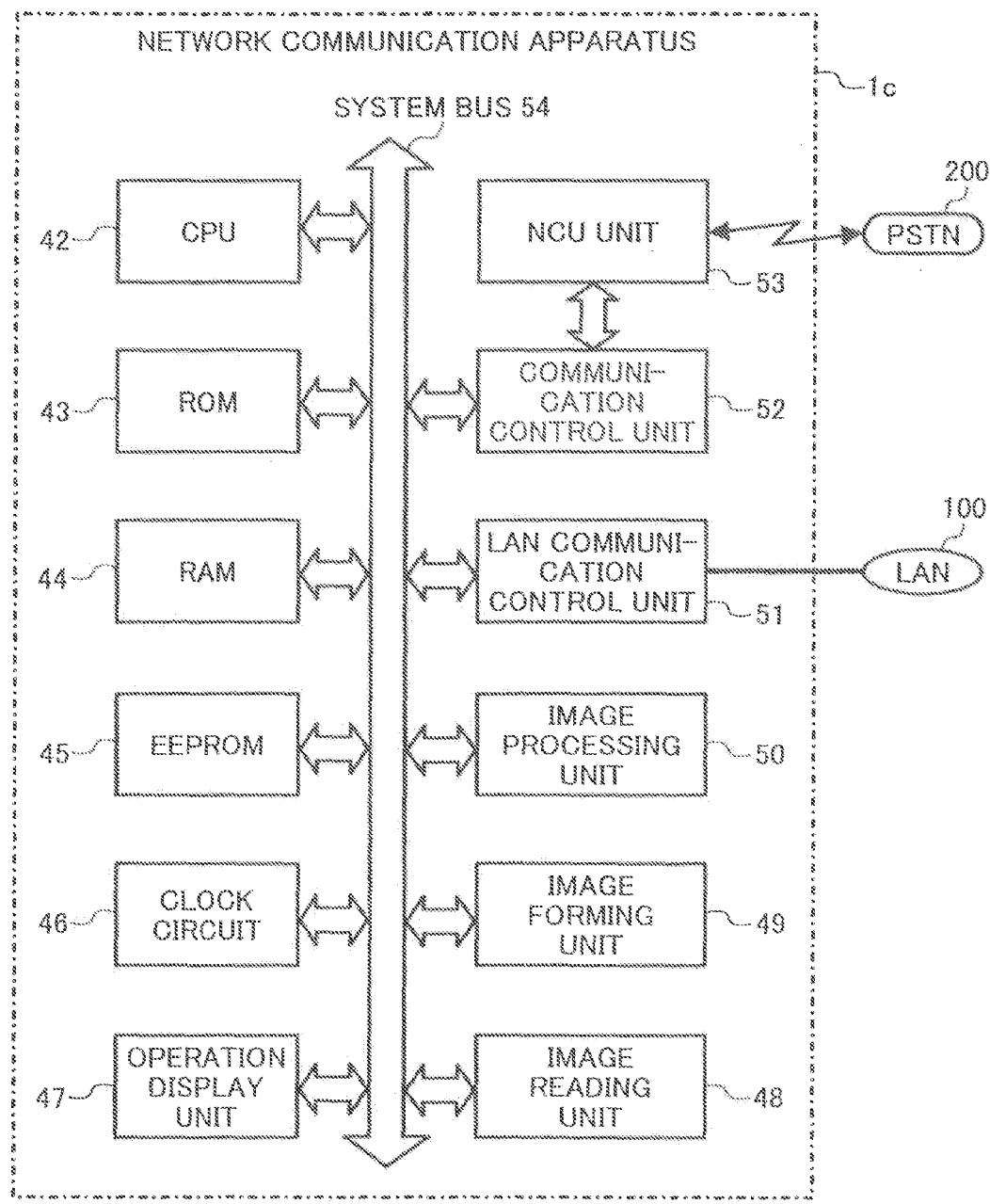
FIG. 24 is a block diagram of the network communication apparatus shown in FIG. 23.

FIG. 24 is a block diagram of the network communication apparatus 1c shown in FIG. 23. A central processing unit (CPU) 42 uses a random access memory (RAM) 44 as a working area. The CPU 42 executes control programs stored in a read only memory (ROM) 43 to control each unit in the network communication apparatus 1c, performs data processings, and controls protocols.

The ROM 43 stores the control programs executed by the CPU 42, and data used for the control programs such as font data corresponding to character codes.

An electrically erasable programmable read-only memory (EEPROM) 45 stores data required for operation of the network communication apparatus 1c, and retains the data even when power is turned off from the network communication apparatus 1c. The EEPROM 45 can be replaced by a semantic RAM (SRAM) or a magnetic disk device.

A clock circuit 46 outputs data of the present date/time. The CPU 42 reads the clock circuit 46 through a system bus 54 to know the present date/time.

An operation display unit 47 has keys to receive input from a user, and a display such as a liquid crystal display. The display shows the operation status of the network communication apparatus 1c when necessary, and various messages.

An image reading unit 48 reads an original to obtain image data.

An image forming unit 49 prints the image data onto recording paper.

An image processing unit 50 performs various processings on the image data, including encoding/compressing, decoding/decompressing, binarizing, variable processing, enlarging/reducing, image correcting, changing orders of pixels in main scanning line, adding data such as text expressing the date/time of communication, and so forth.

A LAN communication control unit 51 is a network interface card (NIC) that is connected to the LAN 100. The CPU 42 communicates with the TCP/IP protocol on a LAN protocol. The LAN communication control unit 51 exchanges data with a protocol of an upper layer.

A communication control unit 52 is connected to the PSTN 200 through a network control unit (NCU) 53, and controls communication with a destination terminal. The communication control unit 52 controls the NCU 53, detects a pulse of a ringing voltage detected by the NCU 53, detects a dial tone multi frequency (DTMF) signal, detects a tone signal, and makes a call for transmission. The communication control unit 52 has a modem for demodulating modulated data received from another terminal, or modulating data before sending the data. Specifically, the communication control unit 52 includes a low-speed modem function (V.21) for exchanging G3 facsimile control signals compliant with the ITU-T Recommendation T.30, and a high-speed modem function (V.17, V.33, V.34, V.29, V27ter, etc.) mainly used for exchanging image data.

The NCU 53 is connected to the PSTN 200, and closes lines, detects a call signal (ringing), etc.

The system bus 54 are signal lines including a data bus, an address bus, a control bus used by each unit for exchanging data, and an interrupt signal line.

FIG. 25 is an example of XML data. The URL is specified as follows (in a case of "get").
http://133.139.61.111/web/guest/ja/websys/webArch/foaf.xml http://133.139.61.111/web/ is a communication protocol, and specifies either http or https.

"guest" indicates a user profile. Either a "guest" mode (a particular individual is not authenticated) or an "entry" mode (an individual is authenticated, or a user logs on as the administrator) is specified.

"ja" specifies a language used for displaying the text, selected from predetermined languages. Usually, the language that can be selected in a main operation unit is used.

"websys/webArch" indicates a function; communication history is specified by "webfax", job history is specified by "jobhistory". "websys/webArch" specifies the top page.

"foaf.xml" indicates an FOAF file name.

Figure 26:
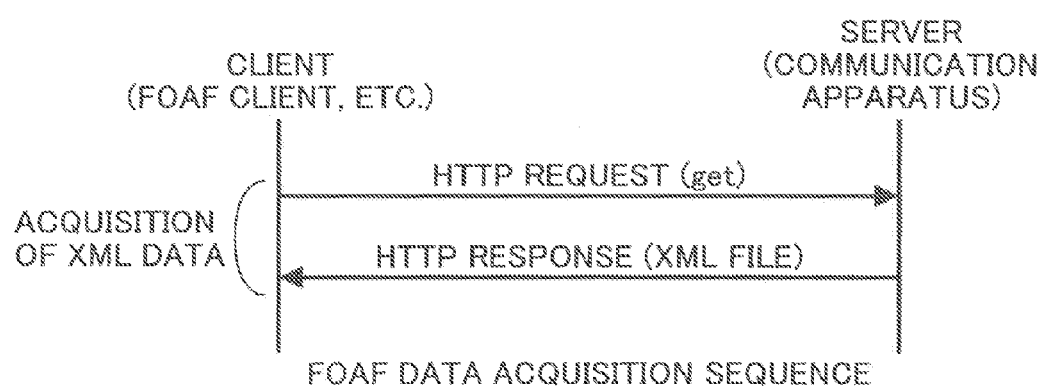
FIG. 26 is a sequence for acquiring FOAF data.

FIG. 26 is a sequence between the network communication apparatus 1a and client software operated by the PC 101a, etc. The client sends a request to acquire data, by get or post command with the HTTP. The network communication apparatus 1c returns an FOAF file (XML data).

To show that there is FOAF data, a link element is used to include the following description in the HTML, as in the case of RSS: link rel="meta" type="application/rdf+xml" title="FOAF" href="foaf.rdf"/

Figure 27:
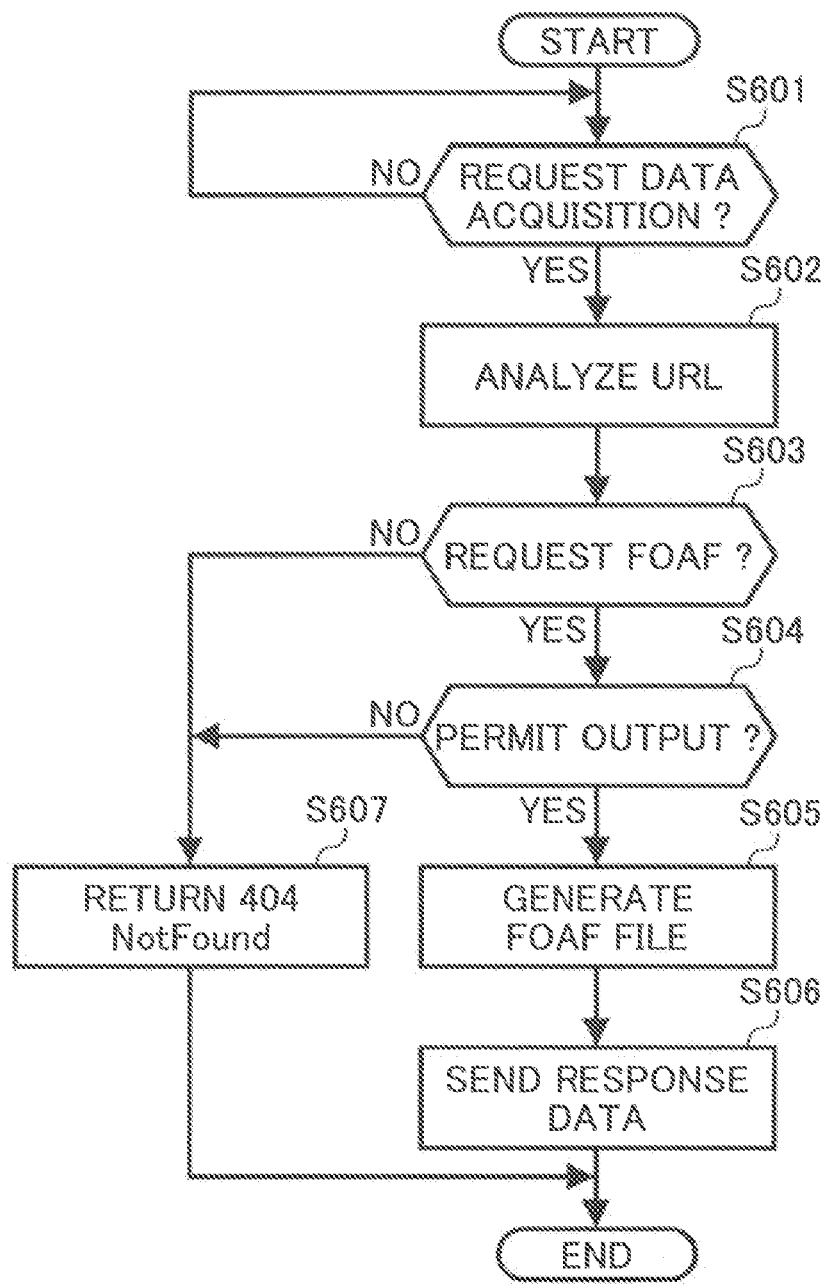
FIG. 27 is a flowchart of a FOAF data response sequence.

FIG. 27 is a flowchart of a response sequence performed by the network communication apparatus 1c. When a request is received from the client, (Yes at step S601), the network communication apparatus 1c analyzes an argument of a GET command (step S602). When the specified URL is a FOAF file name (Yes at step S603), the network communication apparatus 1c generates FOAF data (step S605), and returns an FOAF file as XML data (step S606). When the specified URL does not exist (No at step S603), the network communication apparatus 1c returns 404NotFound.

When FOAF is not allowed to be open to public (e.g., variable by setting item of software) (No at step S604), the network communication apparatus 1c returns 404NotFound.

Figure 28:
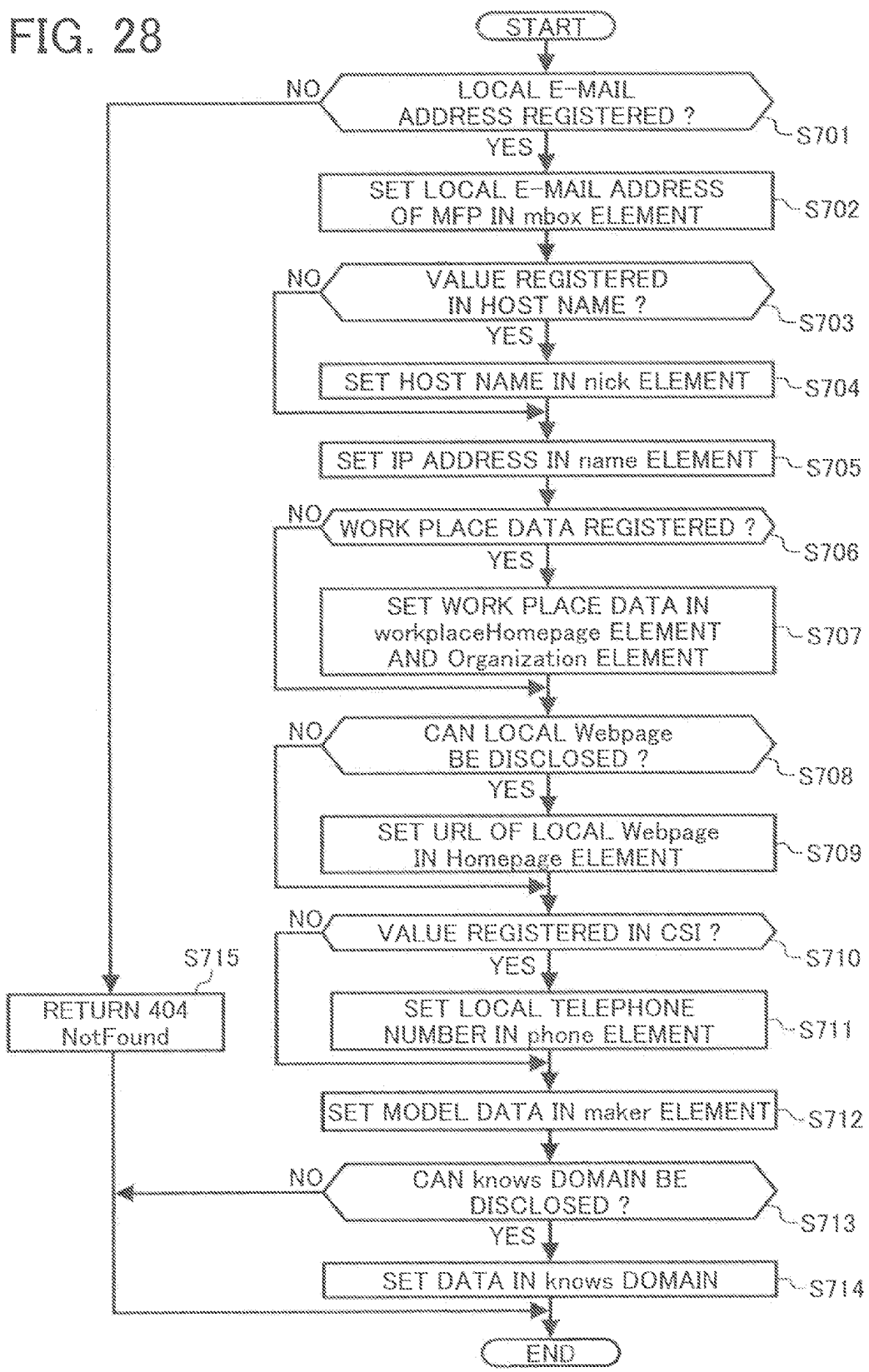
FIG. 28 is a flowchart of an FOAF data element generation sequence.

FIG. 28 is a flowchart of an FOAF data element generation sequence performed by the network communication apparatus 1c. When an e-mail address is registered in the network communication apparatus 1c (Yes at step S701), the network communication apparatus ic outputs its e-mail address in an mbox element in a Person domain in FOAF data, as shown in FIG. 25 (step S702). When the e-mail address is not registered (No at step S701), the network communication apparatus 1c does not output an FOAF file, and when an FOAF file is requested, the network communication apparatus 1c returns 404NotFound (step S715).

When a host name is registered in the network communication apparatus 1c (Yes at step S703), the network communication apparatus 1c sets its host name in a nick element in the Person domain in the FOAF data (step S704). When a host name is not registered (No at step S703), the network communication apparatus 1c does not output a nick element.

The network communication apparatus 1c sets its IP address in the name element (step S705).

When workplace data is registered in the network communication apparatus 1c (Yes at step S706), the network communication apparatus 1c sets a URL of an organization in a workPlaceHompage element, or a name of the organization in an Organization element in the Person domain (if details can be open to public) (step S707). When workplace data is not registered (No at step S706), the network communication apparatus 1c does not output a workplaceHomepage element or an Organization element.

When a Web page of the network communication apparatus 1c is open to public in the Web function (Yes at step S708), the network communication apparatus 1c sets a URL of its Web page in a homepage element in the Person domain (step S709). When a Web page of the network communication apparatus 1c is not open to public (No at step S708), the network communication apparatus 1c does not output a homepage element.

When a telephone number (CSI) of the network communication apparatus 1c is registered in the network communication apparatus 1c (Yes at step S710), the network communication apparatus 1c sets the telephone number in a phone element in the Person domain (step S711). When a CSI is not registered (No at step S710), the network communication apparatus 1c does not output a phone element.

The network communication apparatus 1c sets its manufacturer data in each element under a maker element in the Person domain (name element, depiction element, homepage element, and mbox element) (step S712).

When data of related devices of the network communication apparatus 1c (knows domain) can be open to public (Yes at step S713), the network communication apparatus 1c sets the related device data in the knows domain (step S714). When related device data cannot be open to public (No at step S713), the network communication apparatus 1c does not output a knows domain.

Figure 29:
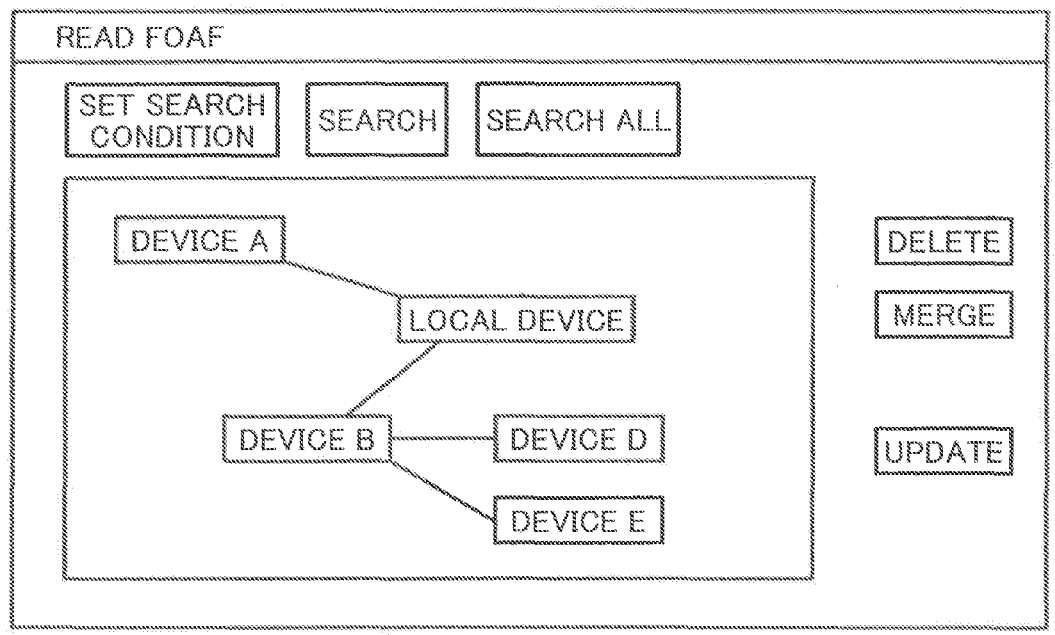
FIG. 29 is a schematic of an FOAF file displayed before merging.

The FOAF file is displayed on the operation display unit 47 as shown in FIG. 29. Boxes showing names of the name elements (or nick elements) of devices, are connected to each other with lines.

The FOAF is read by inputting a URL of the location in a display as shown in FIG. 34. If a device includes a Web server function, the URL can be specified by the Web server function.

Returning to FIG. 29, in order to delete a box, a user presses a delete button while the box is selected. The data of the corresponding device can be deleted from the knows element of the FOAF data registered in the local device.

Figure 30:
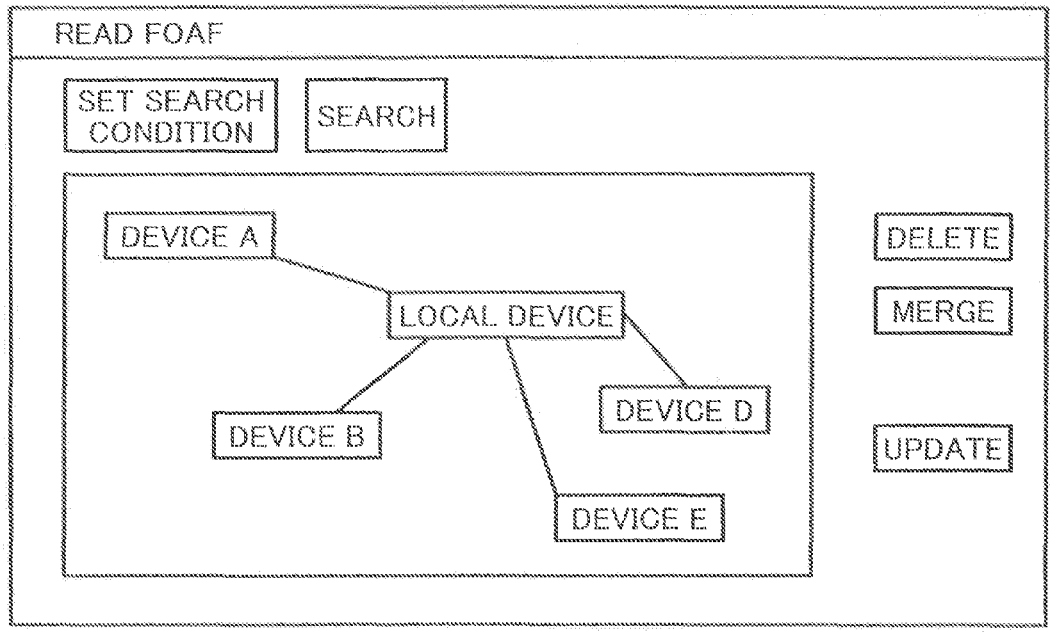
FIG. 30 is a schematic of the FOAF file displayed after merging.
Figure 31:
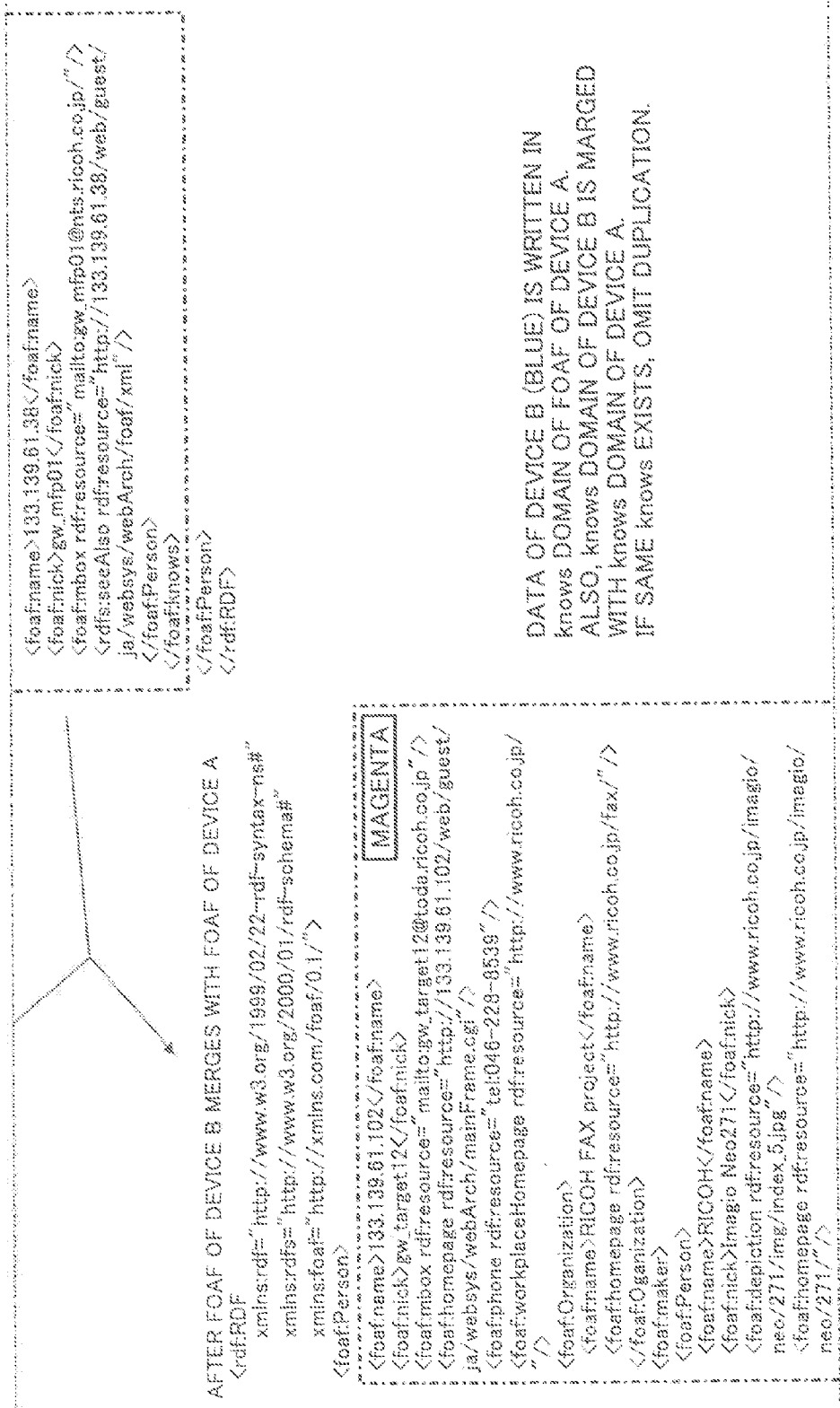
FIG. 31 is a diagram for describing how the FOAF data are merged.

The FOAF data of the local device can be merged with FOAF data of a related device. For example, when a merge button is pressed while a device B is selected, a device D and a device E that are related to the device B as shown in FIG. 29, become directly connected to the local device as shown in FIG. 30. Specifically, FOAF data of the device D and the device E become included in the knows domain of the local device. FIG. 31 is a diagram for describing how the FOAF data are merged.

Figure 32:
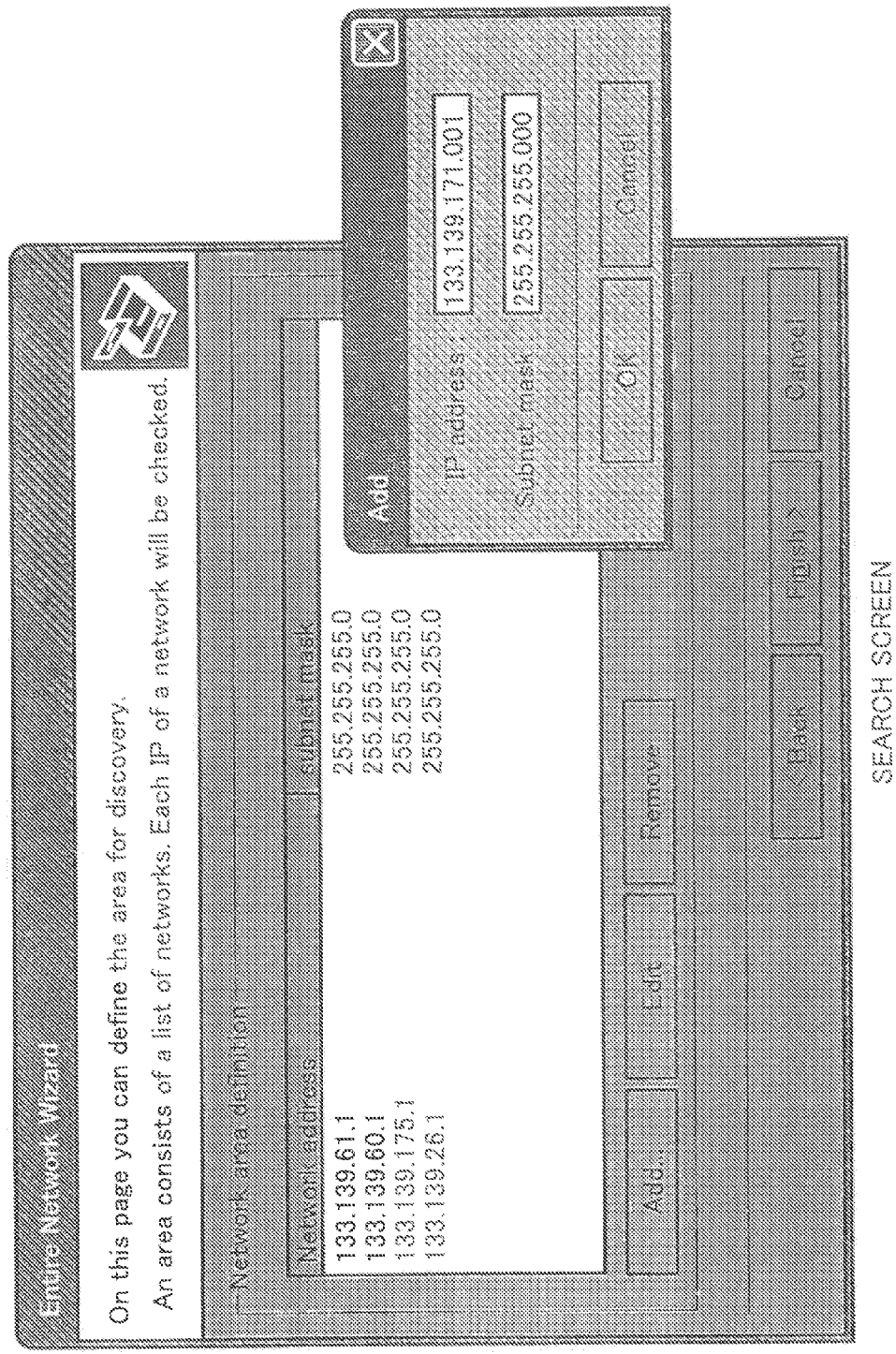
FIG. 32 is a screen displayed when searching for another device for outputting FOAF data.

FIG. 32 is a diagram for describing how to search another device for outputting FOAF data by specifying a range of IP addresses. The screen in FIG. 32 is displayed by pressing a search condition set button shown in FIG. 29. The search is executed by pressing a search button shown in FIG. 29. One method of searching is to specify a range of IP address 133.139.61.1 to 133.139.61.255 within a URL http://133.139.61.102/web/guest/ja/websys/webArch/foaf.xml.

Another method is to use a simple network time protocol (SNTP) or a Web service (simple object access protocol (SOAP)) to acquire a URL of a device with a predetermined interface (I/F).

A searched device can be automatically displayed in the screen shown in FIG. 29. FOAF data of the searched device can be automatically merged with the FOAF data of the local device.

Figure 33:
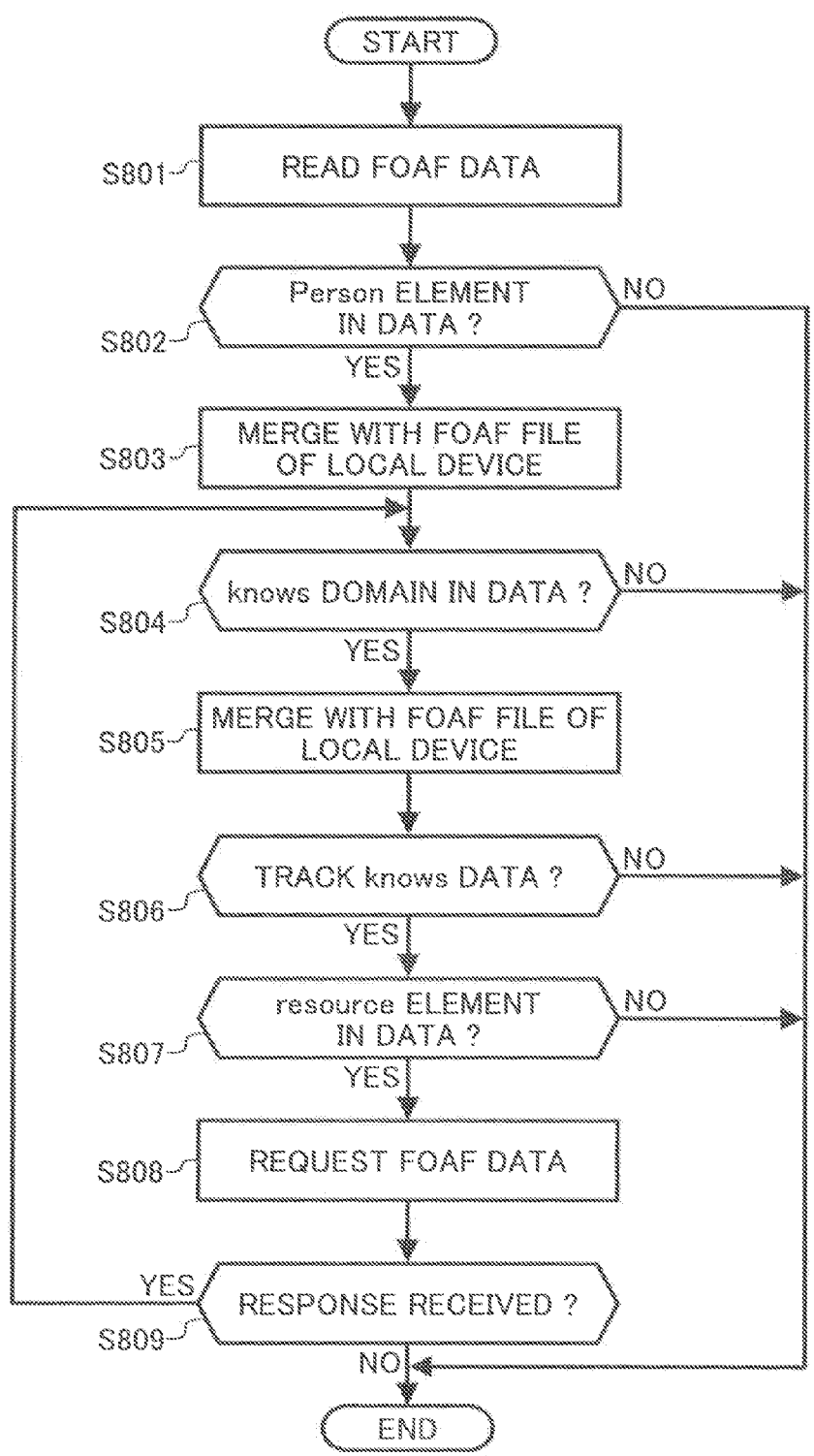
FIG. 33 is a flowchart of an FOAF merge sequence.

FIG. 33 is a flowchart of an FOAF merge sequence. When a device reads FOAF data of another device by automatic searching, or by specifying a URL as shown in FIG. 34, the device acquires the FOAF data of the other device with HTTP (step S801). When the FOAF data is acquired, the device checks whether a Person domain is included (step S802). When a Person domain is included (Yes at step S802), the Person domain is merged with a knows domain in FOAF data of the local device (step S803). Moreover, the device checks whether a knows domain is included in the acquired FOAF data (step S804).

When a knows domain is included in the acquired FOAF data (Yes at step S804), the knows element is merged with the FOAF data of the local device (step S805). A resource element in the acquired knows domain includes a URL of FOAF data of yet another related device, so the device accesses the URL to acquire FOAF data of the related device (steps S806 to S808). Steps S804 to S808 are repeated until FOAF data of all related devices are acquired (No at step S809), and the sequence ends.

A restriction can be set so that the device does not endlessly acquire all related devices, but only up to, e.g., three layers of related devices.

Moreover, instead of showing a URL of a Website, a URL of RSS output can be shown in foaf:homepage rdf:resource="http://133.139.61.102/web/guest/ja/websys/webArch/rss.xml"/.

These URLs can be collected together in an outline element in outline processor markup language (OPML). FIG. 35 is an example of an OPML file including RSS data.

The OPML is a typical XML format that is used to integrate a plurality of RSS data. Specifications of the OPML are defined in opml.org. The OPML is basically a data description language for outline processors.

A URL of FOAF data is included in the resource element of the knows domain. These URLs are collected together and written in xmlurl in an outline element in the OPML. FIG. 36 is an example of an OPML file including URLs of FOAF data. When the FOAF includes a homepage element, the URL is written in htmlurl in the outline element in the OPML.

The data is preferably divided by knows domains of each device (e.g., a section of <outline text="device A">, and a section of <outline text="device B">.

Figure 37:
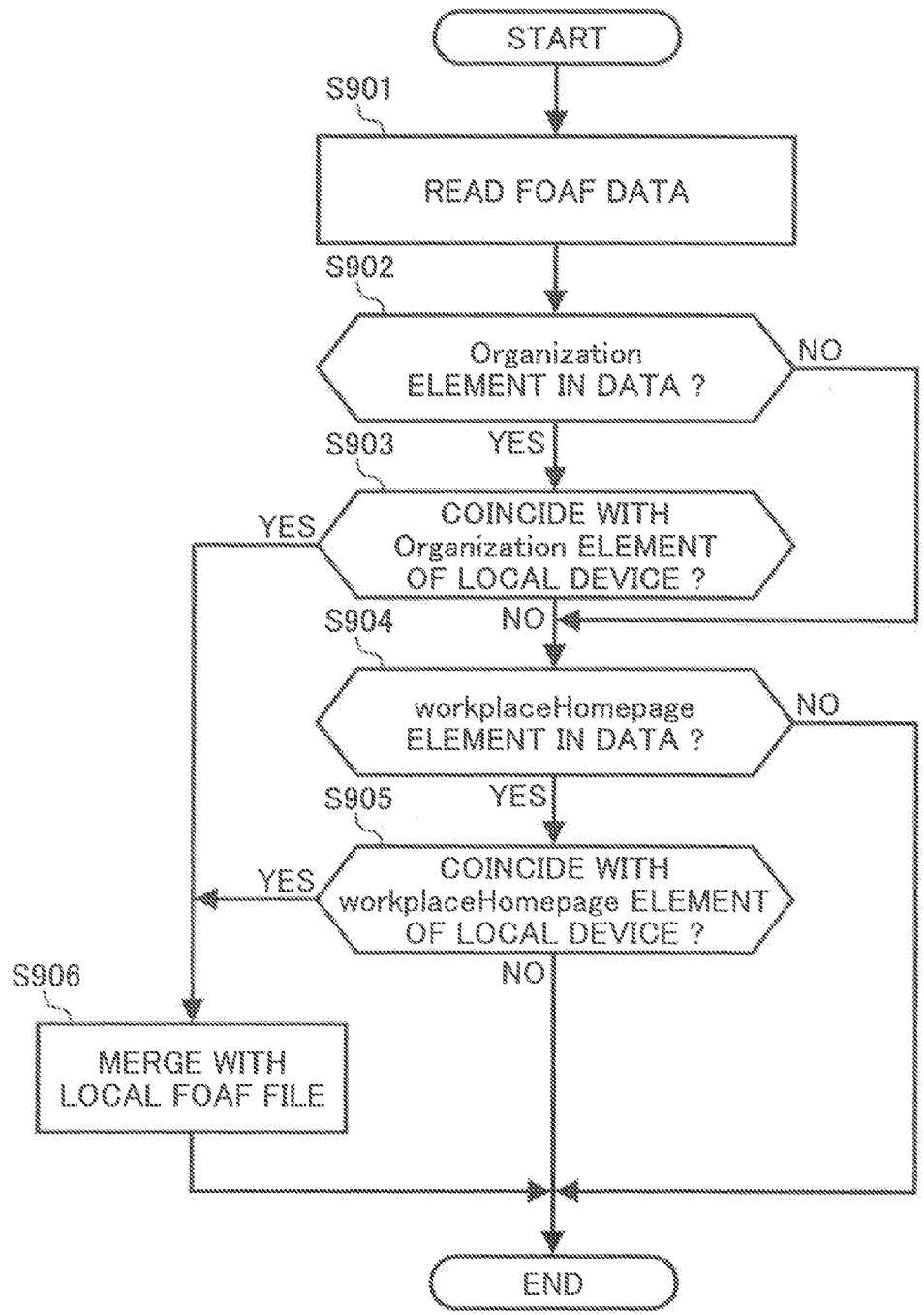
FIG. 37 is a flowchart of a processing for collecting FOAF data of network communication apparatuses belonging to the same organization.

FIG. 37 is a flowchart for collecting FOAF data of network communication apparatuses belonging to the same organization. A device acquires FOAF data of another device (step S901), and checks whether the FOAF data includes an Organization element (step S902). When the FOAF data includes an Organization element (Yes at step S902), and it matches a name element in the organization element of the local device (Yes at step S903), the acquired FOAF data is merged with that of the local device (step S906).

When an Organization element is not included (No at step S902), but a workplaceHomepage element is included (Yes at step S904), and the workplaceHomepage element matches that of the local device (Yes at step S905), the acquired FOAF data is merged with that of the local device (step S906). When neither of the elements match (No at step S905), the FOAF data is not merged.

The step S906 can be replaced with a processing of adding the other device in the display shown in FIG. 29 only when the Organization element or the workplaceHomepage element match with that of the local device (Yes at step S903 or step S905). When neither matches, the other device is not added to the display shown in FIG. 29.

The element to be displayed can be changed according to various conditions. For example, data in the mbox element can be displayed only when the Organization element or the workplacehomepage element match with that of the local device.

Accordingly, the network communication apparatus can disclose/share data of different devices in a standardized data format. Thus, the data can be acquired to show relationships between the devices. Moreover, because the data is in XML format, it can be easily used for secondary purposes.

The present invention is not limited to these embodiments. Various modifications can be made by those skilled in the art without departing from the spirits of the invention.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network communication apparatus comprising:
a history storing unit configured to store communication history data;
a receiver configured to receive a request in a form of a GET command for acquiring the communication history data from a terminal based on the hyper text transfer protocol via the network, the GET command including information on a designated extensible-markup-language format to be used for the communication history data;
a determining unit configured to analyze an argument of the GET command to determine the designated extensible-markup-language format from among a plurality of extensible-markup-formats;
a data generating unit configured to generate extensible-markup-language data corresponding to the determined extensible-markup-language format based on said GET command; and
a sending unit configured to send the generated extensible-markup-language data to the terminal via the network as the communication history data, in response to the received request,
wherein the data generating unit generates a list of information in a text format and individual information in the determined extensible-markup-language format, the list of information presenting information related with receiving and sending of the network communication apparatus in response to the received request from the terminal, the individual information presenting detailed information related with each element of the list of information.

2. The network communication apparatus according to claim 1, wherein when a search condition is specified in the request, the sending unit extracts the communication history data based on the search condition, and sends the communication history data extracted to the terminal as a semantic extensible-markup-language document in a resource-description-framework format.

3. The network communication apparatus according to claim 1, wherein the sending unit is further configured to describe a uniform resource locator of a Web page that displays individual history data included in the communication history data, in the semantic extensible-markup-language document to be sent.

4. The network communication apparatus according to claim 1, wherein the sending unit is further configured to allocate a display of information corresponding to an individual history data included in the communication history data, in a title field of the semantic extensible-markup-language document to be sent.

5. The network communication apparatus according to claim 4, wherein the sending unit is further configured to allocate a display of time information of the individual history data in a date and time field associated with the title field of the semantic extensible-markup-language document to be sent.

6. The network communication apparatus according to claim 4, wherein the sending unit is further configured to allocate a display of a creator of the individual history data in a creator field associated with the title field of the semantic extensible-markup-language document to be sent.

7. The network communication apparatus according to claim 4, wherein the sending unit is further configured to allocate a display of a uniform resource locator of a thumbnail image for image data corresponding to the individual history data in an image field associated with the title field of the semantic extensible-markup-language document to be sent.

8. The network communication apparatus according to claim 1, wherein when the communication history data is for multiple destinations, the sending unit creates an individual history data for each of the destinations, and issues identification data to each of the individual history data.

9. The network communication apparatus according to claim 1, wherein when the semantic extensible-markup-language document to be sent is in an Atom format, the sending unit includes history display data in hypertext markup language format in the semantic extensible-markup-language document.

10. A network communication apparatus comprising:
a terminal-information storing unit configured to store terminal information of a local terminal and a related terminal, as terminal-related information;
a receiver configured to receive a request in a form of a GET command for acquiring the terminal information from other terminal, the terminal-related information in a predetermined friend-of-a-friend format to the other terminal based on the hyper text transfer protocol to the terminal, the GET command including information on a designated extensible-markup-language format to be used for the terminal-related information;
a determining unit configure to analyze an argument of the GET command to determine a designated extensible-markup-language format from among a plurality of extensible-markup-formats;
a data generating unit configured to generate extensible-markup-language data corresponding to the determined extensible-markup-language format based on said GET command; and
a sending unit configured to send the generated extensible-markup-language data to the terminal via the network as the communication history data, in response to the received request for acquiring terminal information,
wherein the data generating unit generates a list of information in a text format and individual information in the determined extensible-markup-language format, the list of information presenting information related with receiving and sending of the network communication apparatus in response to the received request from the terminal, the individual information presenting detailed information related with each element of the list of information.

11. The network communication apparatus according to claim 10, wherein the sending unit is further configured to set a function, upon receiving the request, whether to allow a respond to the request.

12. The network communication apparatus according to claim 10, wherein
when an e-mail address of the local terminal is registered as the terminal-related information, the sending unit sends the response information to the other terminal in response to the request, and when the e-mail address of the local terminal is not registered, the sending unit sends error information to the other terminal in response to the request.

13. The network communication apparatus according to claim 10, wherein the sending unit is further configured to include a network address or a host name in the response information.

14. The network communication apparatus according to claim 10, wherein the sending unit is further configured to include information on a location of the local terminal in the response information.

15. The network communication apparatus according to claim 10, wherein when a Web page of the local terminal is set to be disclosed, the sending unit includes a uniform resource locator for accessing the Web page in the response information, and when the Web page of the local terminal is set not to be disclosed, the sending unit does not include the uniform resource locator in the response information.

16. The network communication apparatus according to claim 10, wherein when a called subscriber identification is registered in the local terminal, the sending unit includes a telephone number of the local terminal in the response information.

17. The network communication apparatus according to claim 10, wherein when model information is registered in the local terminal, the sending unit includes the model information in the response information.

18. The network communication apparatus according to claim 10, wherein when the terminal information of the related terminal is set to be disclosed, the sending unit includes the terminal information of the related terminal in the response information, and when the terminal information of the related terminal is set not to be disclosed, the sending unit does not include the terminal information of the related terminal in the response information.

19. A network communication apparatus comprising:

a communication unit configured to receive a request in a form of a GET command for acquiring data of a local terminal based on a hyper text transfer protocol from a client application operating in other terminal via a network, the GET command including information on a designated extensible-markup-language format to be used for acquiring the data of the local terminal;

a data acquiring unit configured to acquire the data of the local terminal as a semantic extensible-markup-language document in response to the received request;

a sharing unit configured to output a rich site summary format, and causes the communication unit to send and receive the data of the local terminal and data of other terminal via the network, to disclose and share the data of the local terminal and the data of the other terminal in a friend-of-a-friend format;

a friend-of-a-friend acquiring unit configured to cause a friend-of-a-friend client connected to the local terminal to read and acquire friend-of-a-friend data of the other terminal via the network;

a determining unit configured to analyze an argument of the GET command to determine the designated extensible-markup-language format from among a plurality of extensible-markup-formats;

a data generating unit configured to generate extensible-markup-language data corresponding to the determined extensible-markup-language format based on said GET command; and a sending unit configured to send the generated extensible-markup-language data to the terminal via the network as the communication history data, in response to the received request, wherein the data generating unit generates a list of information in a text format and individual information in the determined extensible-markup-language format, the list of information presenting information related with receiving and sending of the network communication apparatus in response to the received request from the terminal, the individual information presenting detailed information related with each element of the list of information.

20. The network communication apparatus according to claim 19, further comprising:

a friend-of-a-friend merging unit configured to acquire the friend-of-a-friend data of the other terminal, and to merge the friend-of-a-friend data acquired into a knows domain of the friend-of-a-friend data of the local terminal.

21. The network communication apparatus according to claim 19, further comprising:

a friend-of-a-friend editing unit configured to delete and edit the friend-of-a-friend data of the local terminal.

22. The network communication apparatus according to claim 19, further comprising:

a friend-of-a-friend-terminal searching unit configured to search for a terminal that outputs the friend-of-a-friend data.

23. The network communication apparatus according to claim 22, further comprising:

a friend-of-a-friend registering unit configured to automatically register the friend-of-a-friend data of the terminal searched by the friend-of-a-friend-terminal searching unit into a knows domain of the friend-of-a-friend data of the local terminal.

24. The network communication apparatus according to claim 23, further comprising:

a displaying unit configured to acquire rich site summary data of the terminal traced by the friend-of-a-friend data registered by the friend-of-a-friend registering unit, and to display the rich site summary data of the other terminal together as the friend-of-a-friend data of the local terminal.

25. The network communication apparatus according to claim 24, wherein the displaying unit is further configured to display the rich site summary data of the other terminal together as outline processor markup language data in a link.

26. The network communication apparatus according to claim 19, further comprising:

an extracting unit configured to extract a network communication apparatus having same property based on the friend-of-a-friend data acquired.

27. The network communication apparatus according to claim 26, wherein the extracting unit is further configured to extract the network communication apparatus by changing disclosure element of the friend-of-a-friend data based on whether to have the same property.

* * * * *